US007480624B2

(12) United States Patent
Roman et al.

(10) Patent No.: US 7,480,624 B2
(45) Date of Patent: Jan. 20, 2009

(54) SYSTEM FOR SUPPORTING INTERACTIVE PRESENTATIONS TO CUSTOMERS

(75) Inventors: Shawn D. Roman, Potomac, MD (US); Thomas Chiu, New York, NY (US)

(73) Assignee: Accenture Global Services GmbH, Schaffhausen (CH)

( * ) Notice: Subject to any disclaimer, the term of this patent is extended or adjusted under 35 U.S.C. 154(b) by 526 days.

(21) Appl. No.: 10/951,440

(22) Filed: Sep. 27, 2004

(65) Prior Publication Data
US 2006/0074775 A1    Apr. 6, 2006

(51) Int. Cl.
    *G06Q 30/00* (2006.01)
(52) U.S. Cl. ....................................................... 705/14
(58) Field of Classification Search ................. 705/14
    See application file for complete search history.

(56) References Cited

U.S. PATENT DOCUMENTS

| | | | |
|---|---|---|---|
| 5,309,355 A * | 5/1994 | Lockwood | 705/6 |
| 6,453,302 B1 | 9/2002 | Johnson et al. | |
| 6,505,202 B1 * | 1/2003 | Mosquera et al. | 707/10 |
| 7,266,508 B1 * | 9/2007 | Owen et al. | 705/11 |
| 2003/0050799 A1 * | 3/2003 | Jay et al. | 707/2 |
| 2003/0195904 A1 * | 10/2003 | Chestnut et al. | 707/204 |
| 2004/0015536 A1 * | 1/2004 | Cohen et al. | 709/200 |
| 2004/0138943 A1 * | 7/2004 | Silvermail | 705/10 |
| 2004/0148220 A1 * | 7/2004 | Freeman et al. | 705/11 |
| 2004/0168197 A1 * | 8/2004 | Koh et al. | 725/112 |
| 2004/0260577 A1 * | 12/2004 | Dahlin et al. | 705/2 |

FOREIGN PATENT DOCUMENTS

WO    WO-03007108 A2 *    1/2003

OTHER PUBLICATIONS

Anon., "Dendrite and Proscape Announce 'Intelligent' Multimedia Sales Presentation Tools for Series 6 Systems," Business Wire, p. 09261174, Sep. 26, 1996.*
Sweat, J., "Conjoin Offers Customized Product Data—Field.First Makes Sales-Force Automation More Effective With Up-To-Date Information," Information Week, p. 26, Jan. 3, 2000.*
Gertzen, J., "Milwaukee Marketing Firm Launches Online Sales Presentations," Knight-Ridder Tribune Business News (Milwaukee Journal Sentinel-Wisconsin), May 25, 2000.*
Anon., "Proscape Technologies Unveils Proscape Tablet PC Edition; First Software Application to Fully Leverage the Selling Power of Tablet PCs," Business Wire, Nov. 4, 2002.*

* cited by examiner

*Primary Examiner*—Nicholas D Rosen
(74) *Attorney, Agent, or Firm*—Brinks Hofer Gilson & Lione

(57) ABSTRACT

A system is disclosed for supporting interactive presentations to a customer. A customer characteristic is received from a sales representative presentation device. A presentation data is extracted from a sales force automation tool wherein the presentation data is tailored to the customer based on the customer characteristic. The presentation data is transmitted to the sales representative presentation device.

44 Claims, 23 Drawing Sheets

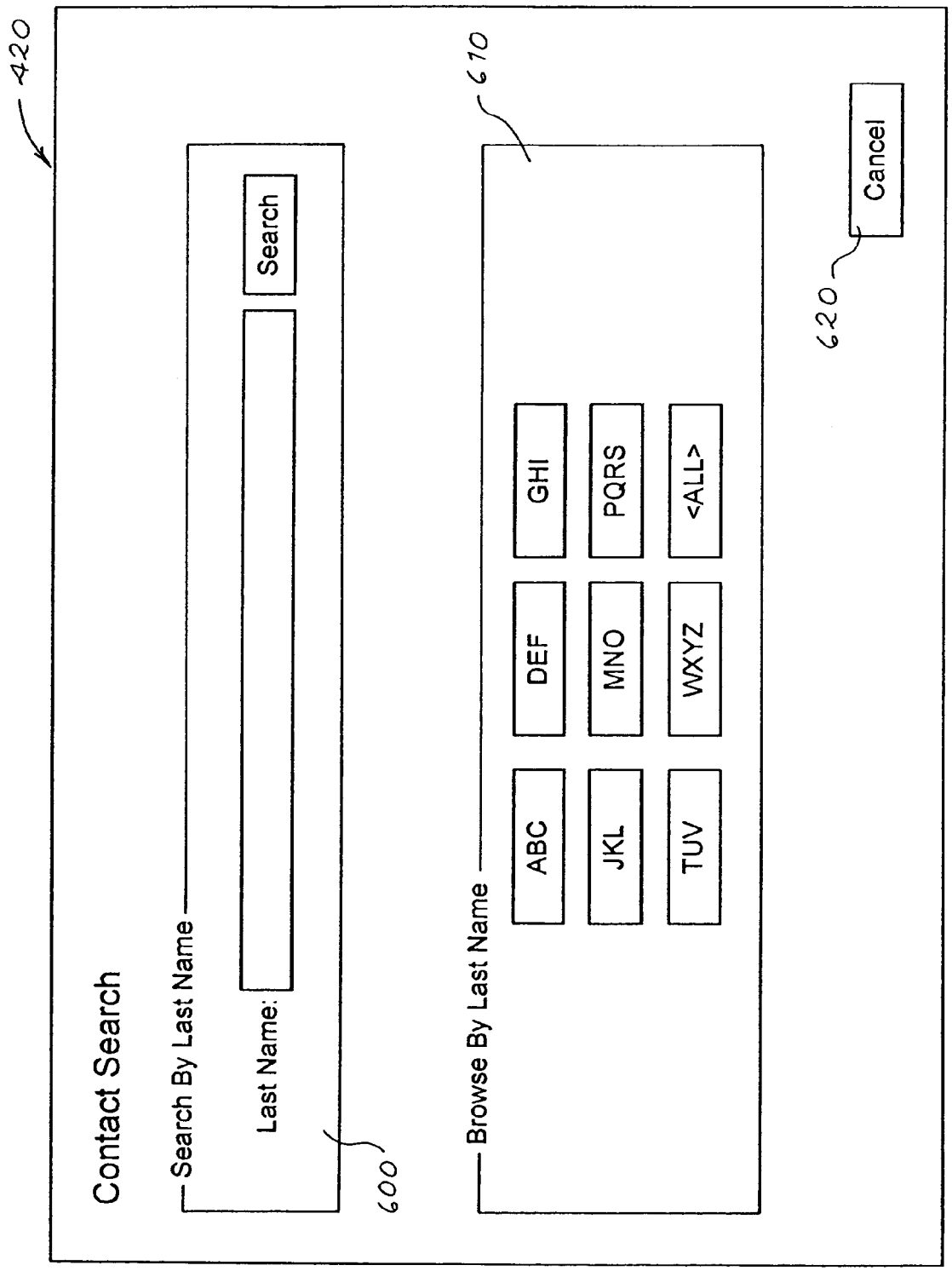

Fig. 7

Search Results

Results Found: 105

| Last Name | First Name | Specialty | Address Line 1 | City |
|---|---|---|---|---|
| Adler | Mike | Critical Care | 111 Doctors Way | Some City |
| Alexander | Marv | Emergency Med | 111 Doctors Way | Some City |
| Amarelo | Roberto | General Practice | 111 Doctors Way | Some City |
| Andersen | Allan | Cardiology | 111 Doctors Way | Some City |
| Atwell | Jeffrey | Family Practice | 111 Doctors Way | Some City |
| Baker | Mark | Pediatrician | 111 Doctors Way | Some City |
| Baniker | Steven | Pulmonology | 111 Doctors Way | Some City |
| Beard | Todd | Rehab Medicine | 111 Doctors Way | Some City |
| Becker | Chris | Internal Medicine | 111 Doctors Way | Some City |
| Berstein | Jon | Dermatology | 111 Doctors Way | Some City |
| Blue | Aaron | Radiology | 111 Doctors Way | Some City |
| Brady | Michael | General Surgery | 111 Doctors Way | Some City |
| Brout | Thomas | Allergy & Immuno | 111 Doctors Way | Some City |
| Browder | Andrew | Rheumatology | 111 Doctors Way | Some City |
| Brown | Allison | Neurology | 111 Doctors Way | Some City |
| Browning | Amanda | Thoracic Surgery | 111 Doctors Way | Some City |

[ Modify Search ]  [ Cancel ]  [ Launch Presentation ]  [ Pre-Call ]  [ Select ]

Physician Info — 802
Allan Andersen
111 Doctors Way
Some City, Some State 11111

Best Times — 804

| Day | Time |
| --- | --- |
| Monday | 3:00 P.M. |
| Tuesday | 10:00 P.M. |
| Wednesday | 2:00 P.M. |

440

Call History — 806

| Date | Call Notes | Type |
| --- | --- | --- |
| 08/23/2004 | This is an example | Professional |
| ▶ 06/18/2004 | This is an example of a call note that is selected and | Professional |
| 03/08/2004 | This is an example | Professional |
| 01/03/2004 | This is an example | Professional |

808 — This is an example of a call note that is selected and is displayed in its entirety in this read-only text-box.

Managed Care — 810

| Plan Name | Total Rx | Percent Payor | Data Month |
| --- | --- | --- | --- |
| Aetna | 68 | 15 | August 2004 |
| BCBS | 12 | 8 | August 2004 |
| Cash | 33 | 3 | August 2004 |
| Other Third Party | 17 | 5 | August 2004 |

Weekly NRx — 812

| Product | Curr WK | Curr Wk-1 | Curr Wk-2 | Curr Wk-3 |
| --- | --- | --- | --- | --- |
| Product 1 | 68 | 15 | 68 | 68 |
| Product 2 | 12 | 8 | 12 | 12 |
| Product 3 | 33 | 3 | 33 | 33 |
| Product 4 | 17 | 5 | 17 | 17 |

Weekly TRx — 814

| Product | Curr WK | Curr Wk-1 | Curr Wk-2 | Curr Wk-3 |
| --- | --- | --- | --- | --- |
| Product 1 | 68 | 15 | 68 | 68 |
| Product 2 | 12 | 8 | 12 | 12 |
| Product 3 | 33 | 3 | 33 | 33 |
| Product 4 | 17 | 5 | 17 | 17 |

Sample History — 816

| Product | Date | Lot Number | Quantity |
| --- | --- | --- | --- |
| Product 1 | 08/23/2004 | 1111 | 50 |
| ▶ Product 2 | 06/18/2004 | 123456 | 50 |
| Product 3 | 03/08/2004 | 123LKJH | 50 |
| Product 4 | 01/03/2004 | QWERTY | 50 |

[ Back ] 818  [ Cancel ] 820  [ Launch Presentation ] 824  [ Select ] 822

Physician Info
Allan Andersen, M.D.
111 Doctors Way
Some City, Some State 11111
1210

Presentation Info
Presentation Name
Date of Presentation (mm/dd/yyyy hh:mm:ss)
1220

460

Call Notes
Please enter call notes
1200

Cancel  1240
Save  1230

SYSTEM FOR SUPPORTING INTERACTIVE PRESENTATIONS TO CUSTOMERS

FIELD OF THE INVENTION

The present invention relates to a system for connecting information between different applications, and more particularly relates to connecting information from detailing applications with information from sales force automation tools.

BACKGROUND

Many businesses, such as pharmaceutical companies and consumer packaged goods companies, use campaign processes to deliver marketing offers to their customers. The campaign processes may include, for example, making telephone calls, mass mailings and/or sending a sales representative to visit the customer.

On the road, sales representatives can utilize detailing applications on tablet personal computers (PC) to help manage their face to face time with their customers. As the number of sales representatives reaches a saturation point, companies are seeking ways to maximize their returns on investments in sales force capabilities and influence buying behaviors more effectively. Businesses may attempt to purchase custom or packaged software such as sales force automation (SFA) tools to aid in improving the productivity, sales, marketing and clinical procedures of pharmaceutical and other life science companies. Oftentimes, businesses find it challenging to integrate data from externally purchased software with their own customer data. The extraction of data from multiple sources to drive analytical modeling can be a very laborious, time consuming process. Furthermore, each time a new form of data analysis need to be performed, a business must rewrite data extraction routines.

In the pharmaceutical industry, for instance, pharmaceutical companies face mounting challenges in the marketing and sales of their products. Over the past 12 years, the numbers of sales representatives has quadrupled while the value of sales visits to physicians has declined. Studies reveal that only one-third of sales visits to physicians were viewed as helpful. Current estimates indicate that more than twenty percent of physicians will not see sales representatives. When physicians do agree to see a representative, eighty-seven percent of those representative-physician interactions last less than two minutes. As an additional consideration, the pharmaceutical industry must confront the increased influence of managed care organizations and regulatory guidelines that mandate education over promotion.

Within pharmaceutical companies, the challenges span entire organizations. Brand teams typically lack deep insight into sales interactions, customer attitudes and beliefs, and can exert little influence. Without an organized way of delivering different messages to different physicians, these teams risk confusing or overwhelming the sales force. Additionally, brand and marketing teams lack the timely, accurate interaction data with which to effectively evaluate their marketing programs and materials. Members of the sales force are typically constrained by static printed materials, such as brochures and reprints, with which they must address different physicians' concerns. Marketing materials are updated and mailed infrequently; reducing the timeliness of sales materials. Amidst these obstacles, sales representatives struggle to capture the physician's attention and gain respect as trusted advisors.

BRIEF SUMMARY

A system is described for providing for better interaction between sales representatives and their customers. The system combines market segmentation, new sales force technologies and improvements to the existing selling process to give sales representatives a flexible means of accessing and presenting product information. Companies can use the system to refine their sales and marketing messages and materials so that sales representatives can customize their sales presentation to customers.

The system receives a customer characteristic from a sales representative presentation device. A presentation data is extracted from a sales force automation tool wherein the presentation data is tailored to the customer based on the customer characteristic. The extracted presentation data is transmitted to the sales representative presentation device.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like reference numerals designate corresponding parts throughout the different views. In the drawings:

FIG. 6 is an exemplary screen of the contact search page.

FIG. 7 is an exemplary screen of the search results page.

FIG. 8 illustrates an exemplary pre-call information screen.

FIG. 9 is an exemplary presentation screen.

FIG. 12 is an exemplary call notes entry screen.

DETAILED DESCRIPTION OF THE PREFERRED EMBODIMENTS

A system can provide companies, such as pharmaceutical companies, consumer packaged goods companies, biotech companies, medical products companies, stock companies and insurance companies, the ability to provide customized, targeted information to customers. The system supports interactive programs, such as detailing software that can be used with a sales representative presentation device. The system allows for the sales representative to quickly switch from a presentation tailored to one customer to another presentation tailored to another customer. The system supports sales force automation tools to enable the sales representatives to engage the customers with targeted, visual demonstrations of their marketing materials. The system can maintain detailed information, such as information that was gathered during interactions between the customers and sales representatives. The system can be used with adaptive marketing systems that use information, such as in a closed-loop fashion, to develop insight that may be used to refine customer interactions. Such an adaptive marketing system is described in commonly owned U.S. patent application Ser. No. 10/302,395, published on May 27, 2004 as U.S. Pub. No. 2004/0103017, the entirety of which is incorporated by reference herein.

Figure 1:
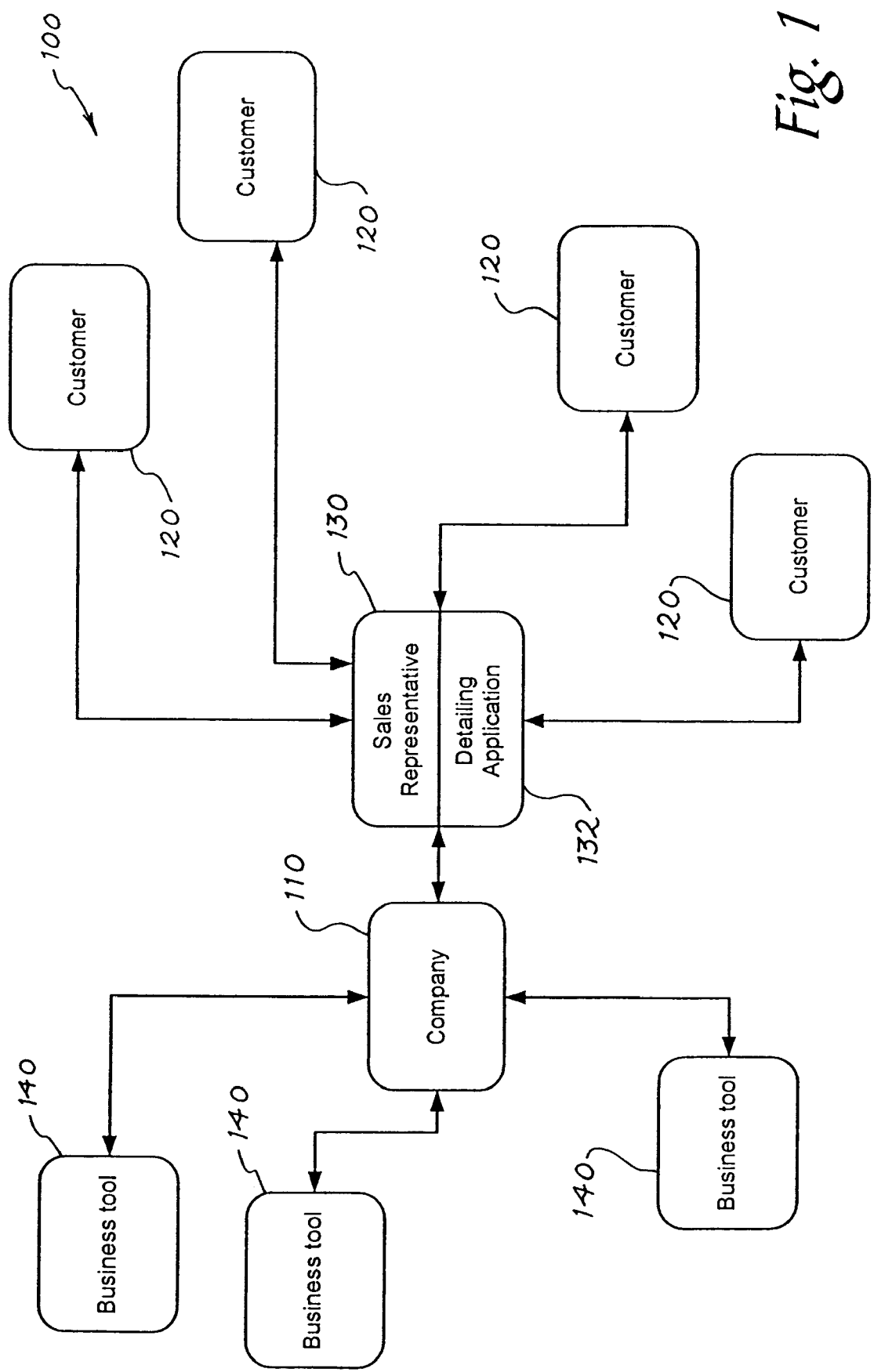
FIG. 1 is a block diagram of a system that can be used by a company to promote products to customers.

FIG. 1 is a block diagram of an exemplary sales system 100 that can be used by a company 110 to promote products to customers 120. The companies can include life science companies, such as pharmaceutical companies, companies that sell consumer packaged goods, stock brokers, insurance brokers, or other companies. For explanatory purposes, the system 100 is described in terms of pharmaceutical companies that sell medical services and/or products, such as pharmaceuticals, to customers 120. The customers of the pharmaceutical companies can include hospitals, urgent care centers, doctors, physicians' assistants, nurses and others, such as private practice medical offices. For explanatory purposes, the customers are sometimes referred to as physicians.

Sales representatives 130 may present products and/or services of the company 110 to the customers 120. The sales representatives 130 can be independent contractors or may be employed by the company. The sales representatives 130 can utilize a presentation device, such as a tablet PC, having a detailing application 132, such as marketing and sales effectiveness software manufactured by PROSCAPE, located in Horsham, Pa. Through the detailing application 132, the sales representatives 130 may deliver to the customer 120 presentations using tools such as visual aids including slides and videos, clinical reprints, opinion leader videos, case studies, physician surveys, medical education invitations, and managed care formulary data. The detailing application 132 may also capture data through an interface, such as a pen based interface. The data may include electronic signatures for samples, physician attitude and opinion survey results, requests for follow-up information, and other data. The detailing software can also display information to the sales representative 130 about the customer 120 such as customer contact information and past purchasing trends of the customer 120.

The company 110 can also use a business tool 140, such as a custom or off the shelf application that provide sales, marketing and clinical processing aids to the company 110. Such applications include sales force automation (SFA) tools manufactured by such companies such as SAP, located in Waldorf, Germany, DENDRITE, located in Morristown, N.J., and SIEBEL, located in San Mateo, Calif. The business tool 140 can enable the company 110 to better understand the customers 120, such as by grouping or segmenting the customers based on buying and/or usage trends. For example, physicians can be segmented as being an early or late adapter to new medications. Sales messages can be customized for the customer and groups of customer belonging to the same segment. The business tool 140 can also aid the company in optimizing sales strategies through test, measurement and feedback.

To optimize sales strategies, the detailing application 132 may record real-time data about sales interactions, such as the order in which materials were presented to the customer 120 and the length of time spent discussing specific materials. The collected information can be transmitted back to company 110 for aggregation and integration with other data sets such as data for the SFA application of the business tool 140. The resulting consolidated data set can be used to evaluate the success of promotions more accurately. The collected information can improve collaboration among the brand teams, agencies, operations, medical bodies, and regulatory organizations, providing a framework for rapid business decisions. The decisions can result in new marketing campaigns and updated marketing materials, which are then prepared and delivered to the sales representatives 130 in a more timely and cost-effective manner.

The information can be sent in real time such as by using a network, such as the Internet. The integrated WLAN capabilities provide the sales representatives 130 with access to the product and customer information when and where the information is needed. Access to the Internet can be handled flexibly, through dial-up, DSL or cable-modem connections, and via wireless connectivity such as with wireless local area networking (WLAN) provided by CENTRINO mobile technology available from INTEL.

Figure 2:
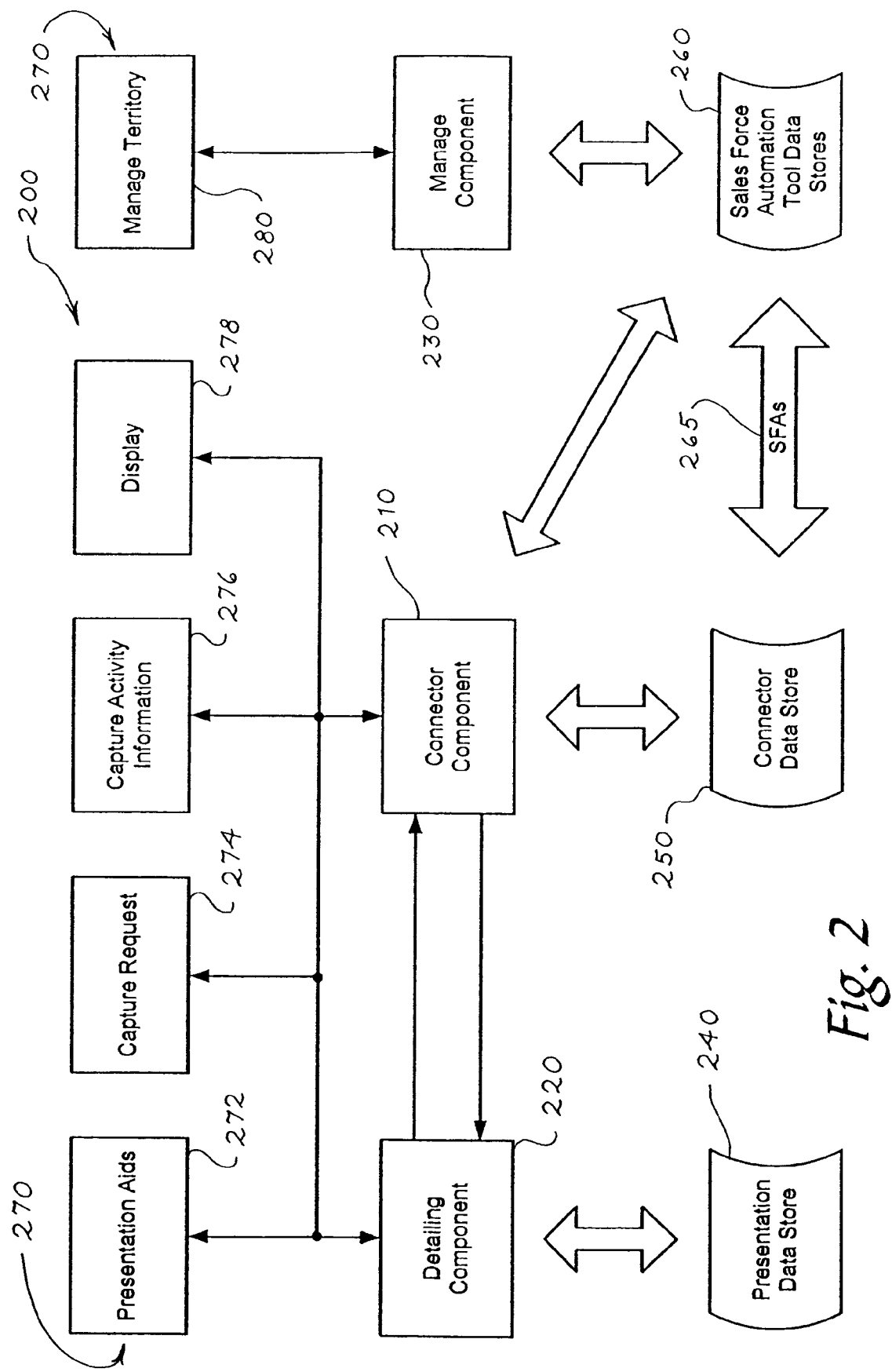
FIG. 2 is a block diagram of an overview of a system to connect information from disparate applications.

FIG. 2 is a block diagram of an overview a connector system 200. The connector system 200 may provide a data exchange system through which different applications or remote locations exchange data, such as information from sales force automation business tool 140 and information from the detailing applications 132. The connector component can be implemented with hardware, firmware and/or software, such as described with regard to FIG. 18. The system 200 integrates software components such as a connector component 210 manufactured by ACCENTURE, a detailing component 220 manufactured by PROSCAPE or other detailing software vendors, and a manage component 230 manufactured by SIEBEL or other sales force automation vendors. The software components can be operated on a MICROSOFT platform constructed clustered or load balanced servers powered by processors such as the INTEL XEON, ITANIUM 2 and PENTIUM processors. The sales force automation tools by SIEBEL and the detailing software by PROSCAPE can include client-based software run on an operating system such as the MICROSOFT WINDOWS XP Tablet operating system on tablet personal computers. The tablet personal computers can be manufactured by various hardware vendors including HEWLETT PACKARD, MOTION, TOSHIBA, and FUJITSU. The client-based integration software from ACCENTURE can be used to integrate customer information developed by the manage component 230 with the information from the detailing component 220 to deliver segmented, customized presentations, such as multi-media presentations, to the customers 120.

To store information used by the system 200, the detailing component 220 connects with a presentation data store 240, the connector component 210 connects with a connector data store 250 and the manage component 230 connects with sales force automation tool data stores 260. The connector data store 250 and the sales force automation tool data stores connect, for example, via the sales force automation tool 265. Components can be connected with data stores either directly with hardware, or remotely, such as with wide area networks (WAN), local area networks (LAN), the Internet, intranets and extranets. The connector component 210 can also directly connect to the sales force automation tool data store 260, without the need for a connector data store 250. The connector component 210 can access data directly from the sales force automation tool data store 260. The connector component 210 may access data in substantially real time and may store information as batch data in the connector data store 250.

The system 200 integrates the detailing software present on a tablet PC with back end information such as the sales force automation tool of the company 110. The system 200 integrates the sales representative's SFA tool with the interactive detailing software by leveraging information, such as sales targeting and segmentation information obtained by the sales representative from the SFA to present a customized, targeted presentation to the customers 110. The customers 110 can be separated or segmented into groups, for example, which respond similarly to certain presentations. For example, one group of customers may be interested in a greater degree of technical information about a product than other customers. Providing custom messages to the varying customer segments helps increase the percentage of "on-message" details and also increases the understanding of influential sales information associated with the product or service. The sales representatives 130 can benefit by being able to keep the customers 120 interested over greater periods of time than if the presentation was not customized. Customers 110 can be more easily engaged in detailed discussions because of the improved accessibility of product information and related resources. Customers 110 can also benefit from the improved integration of the clinical and marketing content and the personalized messages they receive that relate to their specialties and interests. Other benefits include near real-time feedback and analysis to allow the companies 110 to evaluate message effectiveness more rapidly.

Figure 9:
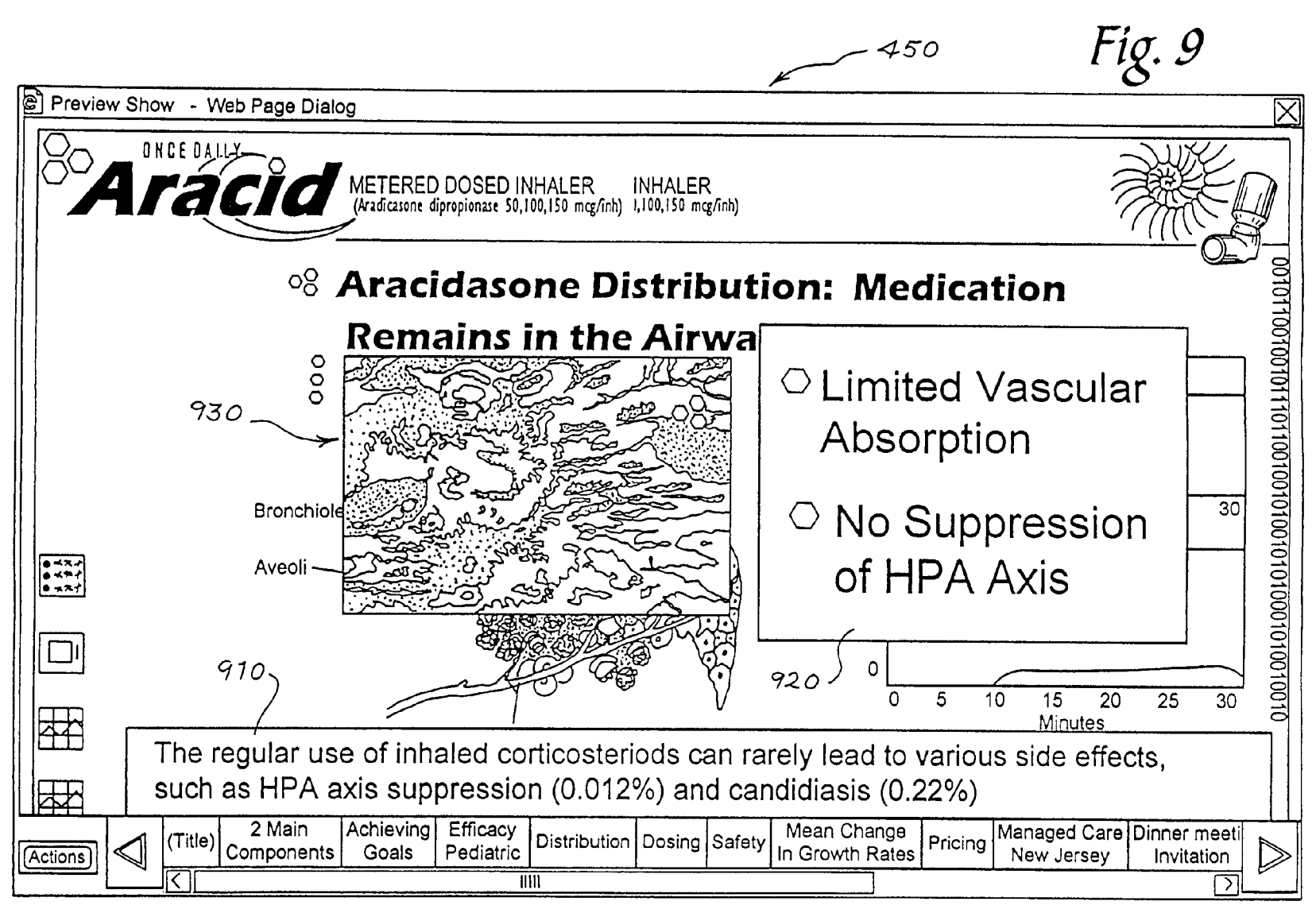

User interface components 270 can be used to present information to, and gather information from, the sales representative 130 and the customer 120. The interface components 270 can include a presentation aid 272, a capture request component 274, a capture activity information component 276, a display component 278, and a manage territory component. The presentation aid 272 can be incorporated into the interactive detailing software which can use the tablet PC to deliver interactive presentations to the sales representative 130 and the customer 120. The interactive presentations include visual aids, reprints of ads, websites, video clips, slide presentations and surveys, or other information that the sales representative can use to present information about a product to the customer 120, for example as shown in FIG. 9. Cost savings can be realized through the reduction of printed promotional materials and the associated reduction in distribution costs.

The capture request component 274 and the capture activity information component 276 can capture details of the interaction between the sales representative 130 and the customer 120. Both the capture request component 274 and the activity information component 276 can capture information generated during or from the sales call. Generally, the capture request component 274 includes screens that capture data related to the customer 120 requesting information or items such as reprints, brochures, samples, medical education events. The activity information component 276 generally pertains to screens that capture data related to details of the call other than requests, such as call notes, responses to surveys and questionnaires, and the physician signature for samples. The call notes can include notes about how receptive the customer 120 was to the call. The information from the capture request component 274 and activity information component 276 can be automatically captured by the detailing software which can use a microphone, mouse, pointer, stylus, and/or other input devices such as a keypad to capture the information. The presentation aid 272, the capture request component 274 and the capture activity information component 276 can be included with the detailing software and/or can be implemented separately.

The connector component 210 connects with the interface components 270 to integrate the interaction details with the information from the sales force integration tool. The combined data can be fed back into the organization's analytical engine for analysis. The detailing component 220 can also connect with the interface components 270 and the connector component 210. Interactive presentation information can be sent from the detailing component 220 to the connector component 210, and information from the connector component 210 can be sent to the detailing component 220. Information from the connector component 210 can be shared with the SFAs 265 through the connector data store 250 or other mechanisms.

The display component 278 can be used to display a list of customer to the sales representative. Other information can also be displayed such as a physician data profile, data about managed care, an activity history of the physician, information about the medications produced by the company and other companies, and a history of the samples used by the physicians in the past.

The manage territory component 280 provides the sales representative with the tools to plan a monthly meetings and calls with the physicians. The tool can also include software to analyze a territory of the sales representative 130. The tool can also provide sample management information and a list of orders by the sales representative. The manage territory component 280 can be included as part of the SFA tool of the business tool 140 and/or can be implemented separately.

Figure 3:
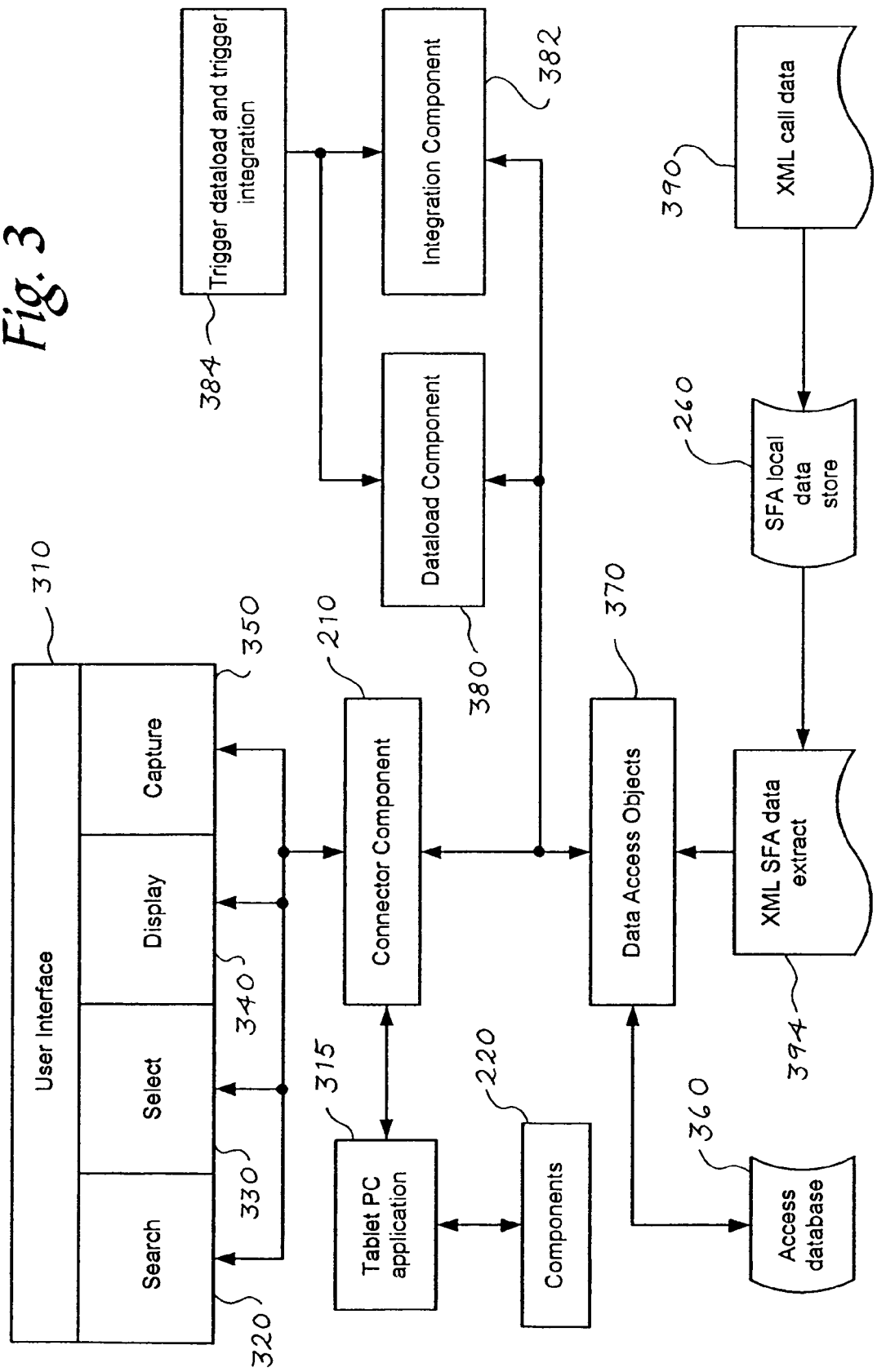
FIG. 3 is a block diagram of an exemplary architecture to connect information from disparate applications.

FIG. 3 is a block diagram of an exemplary architecture 300 to connect information from disparate applications, such as information from sales force automation tools and information from the detailing applications. The architecture includes the connector component 210. The connector component 210 connects with the detailing component 220. The detailing component 220 includes memory for storing a detailing application, such as PROSCAPE for a tablet PC. The connector component 210 can enhance the detailing software by providing user interface logic 310 to the detailing logic 315. The logic can be implemented with hardware or software, or both. The user interface 310 provides logic for searching 320 for customers 120 and selecting 330 the discovered customers 120. The sales representative 130 can launch a presentation directed to the selected customer 120. The information directed to the meeting with the customer 120 can be displayed 340, such as the customer profile information, the managed care data, that activity history, the trends of the prescription and the sampling history of the customer 120. The interface 310 also provides for capture logic 350 to capture information during the presentation, such as in the form of call notes.

The connector component 210 may access information for the user interface 310 from a database 360. The database can be managed using any database management system (DBMS) including MICROSOFT ACCESS, MICROSOFT SQL Server, SYBASE and ORACLE. The architecture 300 can use data access objects 370 to access the database 360. The connector component 210 connects with a dataload component 380 and an integration component 382. The connector component 210, the dataload component 380, and the integration component 382 access the database 360 to send information to and obtain information from the database 360. The access can occur through the data access objects 370 (data access layer) which handle the connection to the database 360. A trigger component 384 triggers the dataload component 380 to load a datastore from the company 110 via a network. The Extensible Markup Language (XML) may provide a mechanism for identifying structure in the datastore. The trigger can occur from a server of the SFA in response to a data synchronization event, or other events. The trigger component 384 can also trigger the integration component 382 to push call data to the SFA, e.g., via a network, in an XML format. The integration component 382 can be triggered as customized by the company 110. The call data is pushed 390 to the SFA datastore 260 via the data access objects 370 and pulled 394 from the SFA datastore 394 via the data access objects 370.

The connector component 210 may integrate existing data in the SFA and the presentation materials in the interactive detailing software. The connector component 210 may allow the sales representative to gain a deep understanding the sales call in a way that it is efficient and intuitive for the sales representative to use. The connector component 210 can be designed to support pre-call planning, call execution and recording of call notes. Data such as customer segment and profile information is passed from the SFA through the connector component 210 to the interactive detailing application of the detailing component 220. Logic to handle specific call scenarios can be stored in the connector component 210. Call details can be passed from the Interactive detailing application through the connector component 210 to support the entry of post-call notes to the SFA application.

Figure 4:
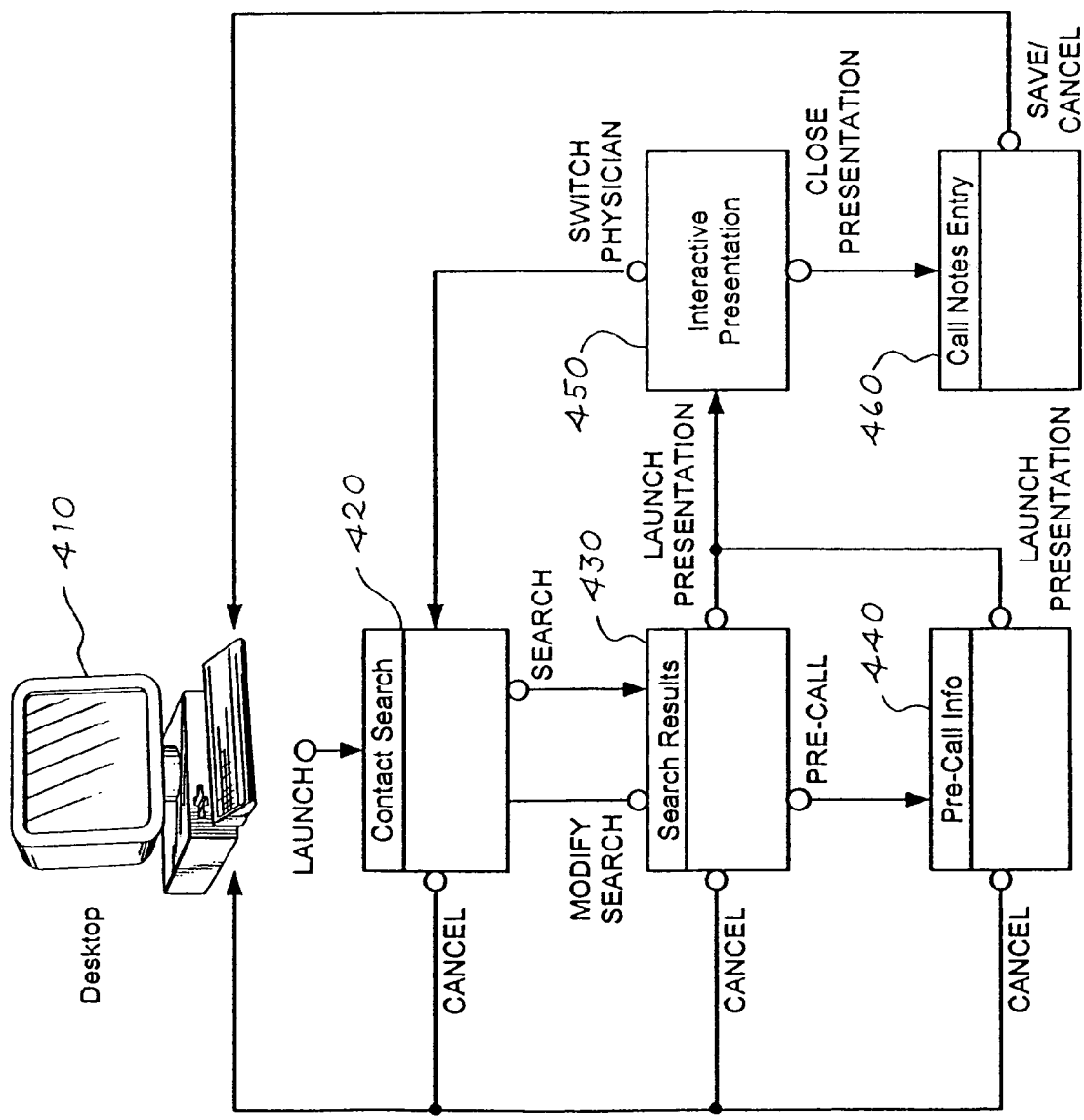
FIG. 4 is a flow chart illustrating displayed interfaces for the sales representative to interact with the system.

FIG. 4 is a flow chart illustrating displayed interfaces 400 and their interrelation for the sales representative to interact with the system 100. The displayed interfaces 400 can include a home page 410 on a desktop, such as one shown on the display of a tablet PC of the sales representative. Other interfaces can be launched from the home page 410. FIGS. 5-9 show examples of the interfaces identified in FIG. 4.

Figure 5:
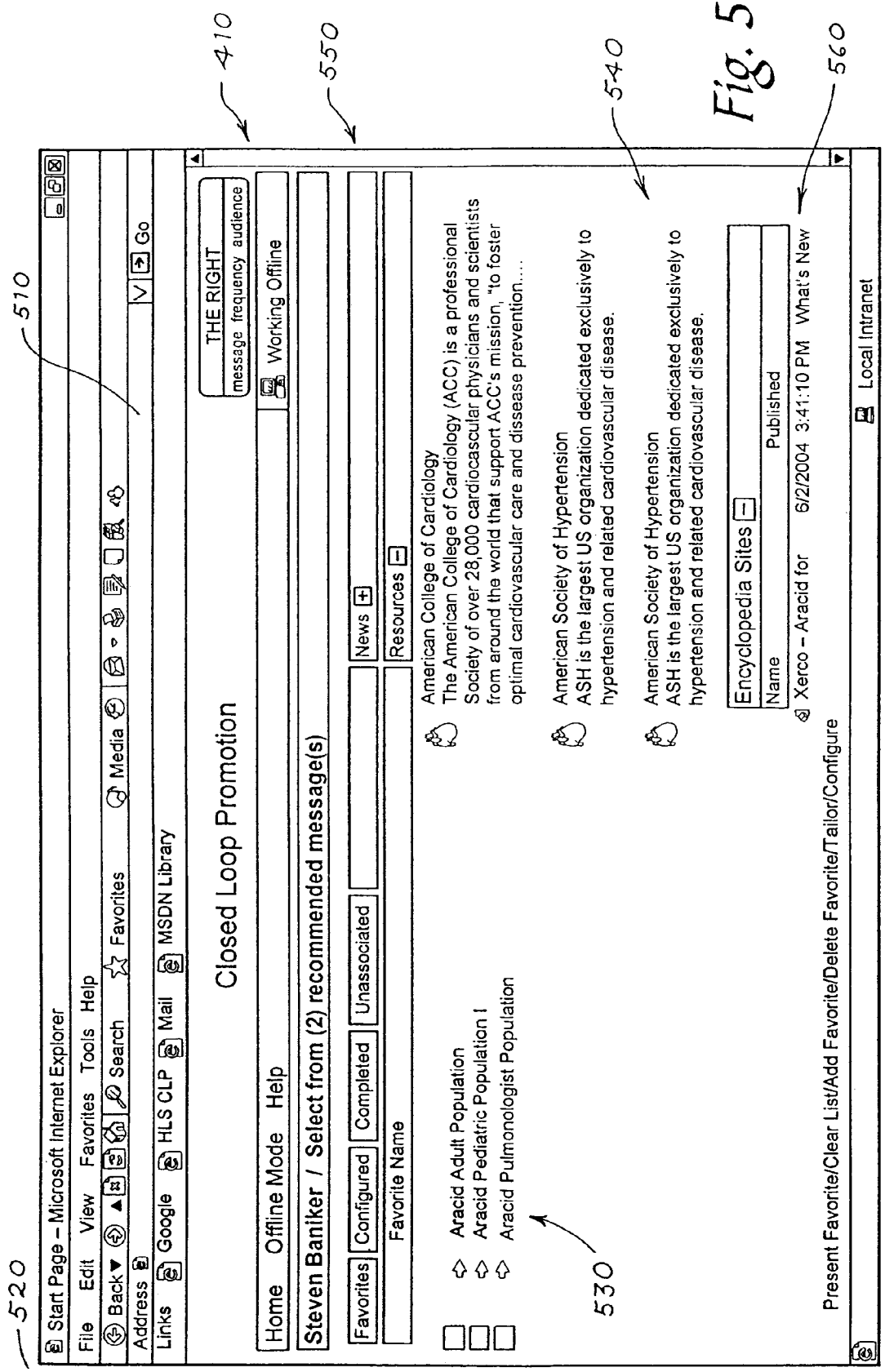
FIG. 5 is an exemplary home page of a detailing software.

FIG. 5 is an exemplary home page 410 of a detailing software, such as PROSCAPE. The home page 410 can be displayed in web-browsers running under the WINDOWS operating system available from Microsoft, the Mac OS available from Apple, or may be displayed in other applications. The home page 410 can be web based and located by a URL 510, or may be displayed in other ways, such as with a POWERPOINT presentation and/or a REALTIME PLAYER. The home page 410 can associate the home page 410 with the name 520 of the customer 120. The home page 410 can also display possible presentations 530, resources 540, news 550 and/or encyclopedia sites, which relate to the presentation. For example, if the presentation relates to medication for controlling hypertension, the resources can include links to the American College of Cardiology, the American Society of Hypertension, or other information sources.

From the home page 410, the sales representative can launch a contact search screen 420, such as to find a customer. FIG. 6 is an exemplary screen of the contact search page 420. The contact search page 420 can provide a name input field 600 to allow the sales representative to search for customer by name, such as a last name. The contact search page 420 can also include a browse field 610 to allow the sales representative to search though a group of customers, such as customers with a last name that begins with a particular letter or group of letters, or to search all of the available customers. The contact search page 420 can also include a cancel button that allows the sales representative to return to the home page 410 without choosing a customer.

From the contact search page 420, the sales representative can launch into a search results page 430. FIG. 7 is an exemplary screen of the search results page 430. The search results page 430 can list the results found by the search. The results can be listed by customer information such as last name 710, first name 720, specialty 730, address 740 and city 750. A scroll bar 760 can be used to scroll through the listings if not all of the listing fit on a single screen. The sales representative can interact with the search results page 430 using buttons such as a modify search button 770. The modify search button 770 can send the user back to the contact search page 420 to run a modified search. The sales representative can also launch a presentation for a selected customer by activating the launch presentation button 772. The sales representative can also activate a select button 774 to select or change the customer to whom the home page and presentation are associated. The sales representative can also activate a cancel button 776 to return to the home page 410 without making another selection. The sales representative can also activate a pre-call button 778 to launch into a pre-call information screen 440 which displays information about the customers being visited. The contact search page and the search results page can be combined into a single page.

FIG. 8 illustrates an exemplary pre-call information screen 440. Data for the pre-call information screen 440 can be gathered using the sales force automation tool 265. The displayed information can include personal information 802 about the customer such as a first name, a last name, a home and/or business street address including the city, state, zip code, and a title. The system can also display scheduling information 804 such as the office hours and/or best days and times to contact the customer 120. The sales force automation tool can also provide a call history 806 with the customer 120, including dates that sales representatives called on the customer 120, notes recorded on those days and the type of visit, for example, whether professional or personal. A field 808 below the call history 806 can display a selected call note. The sales force automation tool 265 can also provide managed care information 810, such as a plan name, the total prescription drugs and the percent payer for the plans and the month of the data. Cash and third party payers can also be listed under the plan name. The sales force automation tool can also provide data that is updated, for example weekly, such as for new prescriptions NRx 812 and for total prescription TRx 814. Information about the products for the current week, month or other time period, and past time periods can be displayed. The sales force automation tool 265 can also provide sample history information 816 such as information about the date of a product, the lot number and quantity. The pre-call information screen 440 can also display other information about the customer 120, such as a specialty of the physician, a degree, segmentation, such as by classifying the customers based on factors and/or variables, and a medical education (ME) number or other number unique to the customer.

User activated buttons can be provided to the sales representative to interact with the pre-call information screen 440, such as a back button 818 to return to the search results screen 430. The sales representative can activate a cancel button 820 to return to the home page 410 without any other interactions. A select button 822 can be used associate the home page and presentation to the customer displayed on the pre-call information screen 440. The sales representative can activate a launch presentation button 824 to directly launch a presentation associated to the customer displayed on the pre-call information screen.

FIG. 9 is an exemplary presentation screen 450 (FIG. 4). The presentation screen 450 can be used to provide a presentation, such as an interactive presentation, to the customer. The presentations can include collections of screens containing information about the product, such as information about a medical service or product to be presented to a customer 120. The presentation can proceed from a title, to main components of the product, goals, efficacy, distribution, dosing, safety, mean changes in growth rate, pricing, managed care information and a meeting invitation. The presentation screen can include textual information 910, slides 920 and movies 930. The presentations are collections of screen that contain all of the pharma product information for the customer 120. The presentation can be customized for the selected customer 120. From the home page 410 (FIG. 4), the sales representative can connect to the sales force automation tool 265 to prepare the presentation.

Figure 10:
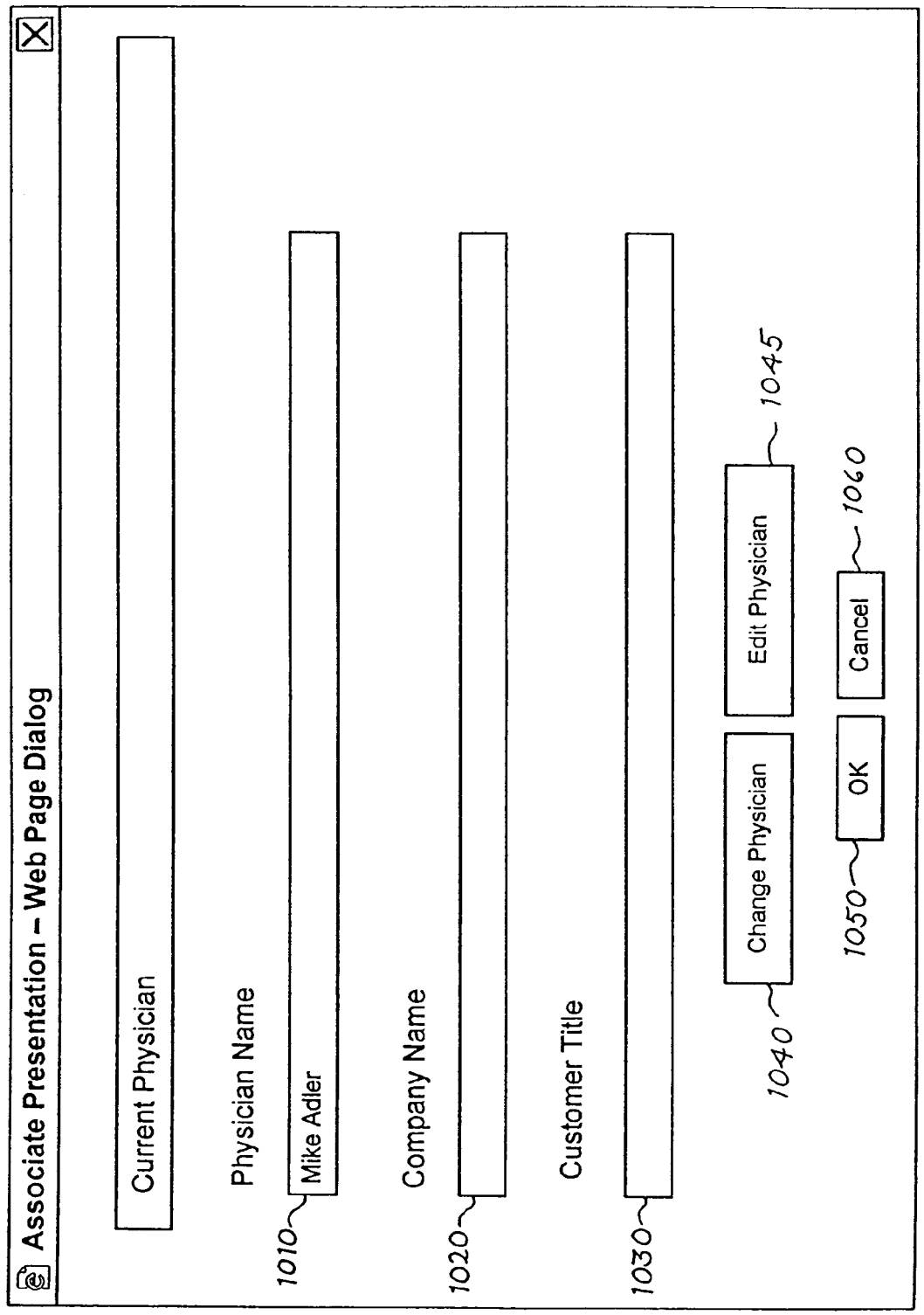
FIG. 10 illustrates an associate presentation dialog screen.

FIG. 10 illustrates an associate presentation dialog screen 1000. The presentation dialog screen 100 can be provided by the detailing software, such as Proscape. The presentation dialog screen can be accessed from the home page when the user wants to associate or switch a customer 120. The associate presentation dialog screen 1000 includes a field for the name of a customer 1010, such as a physician name. The associate presentation dialog screen 1000 can also include a company name field 1020 and a customer title field 1030, to associate the presentation with a particular company and/or title of the customer, respectively. The associate presentation dialog screen 1000 also provides a change physician button 1040, an edit physician button 1045. The change physician button 1040 brings up the contact search page 420. Clicking the select button on the search results page 430 or the pre-call information page 440 returns to the presentation dialog screen 1000 with the newly selected customer displayed. The user can activate on ok button 1050 to confirm a selection. The sales representative 130 can also activate the cancel button 1060 to return to the home page 410 without associating the customer 120. The cancel button 1060 can cause the presentation dialog screen 100 to return with the original customer (if there was one) displayed.

Figure 11:
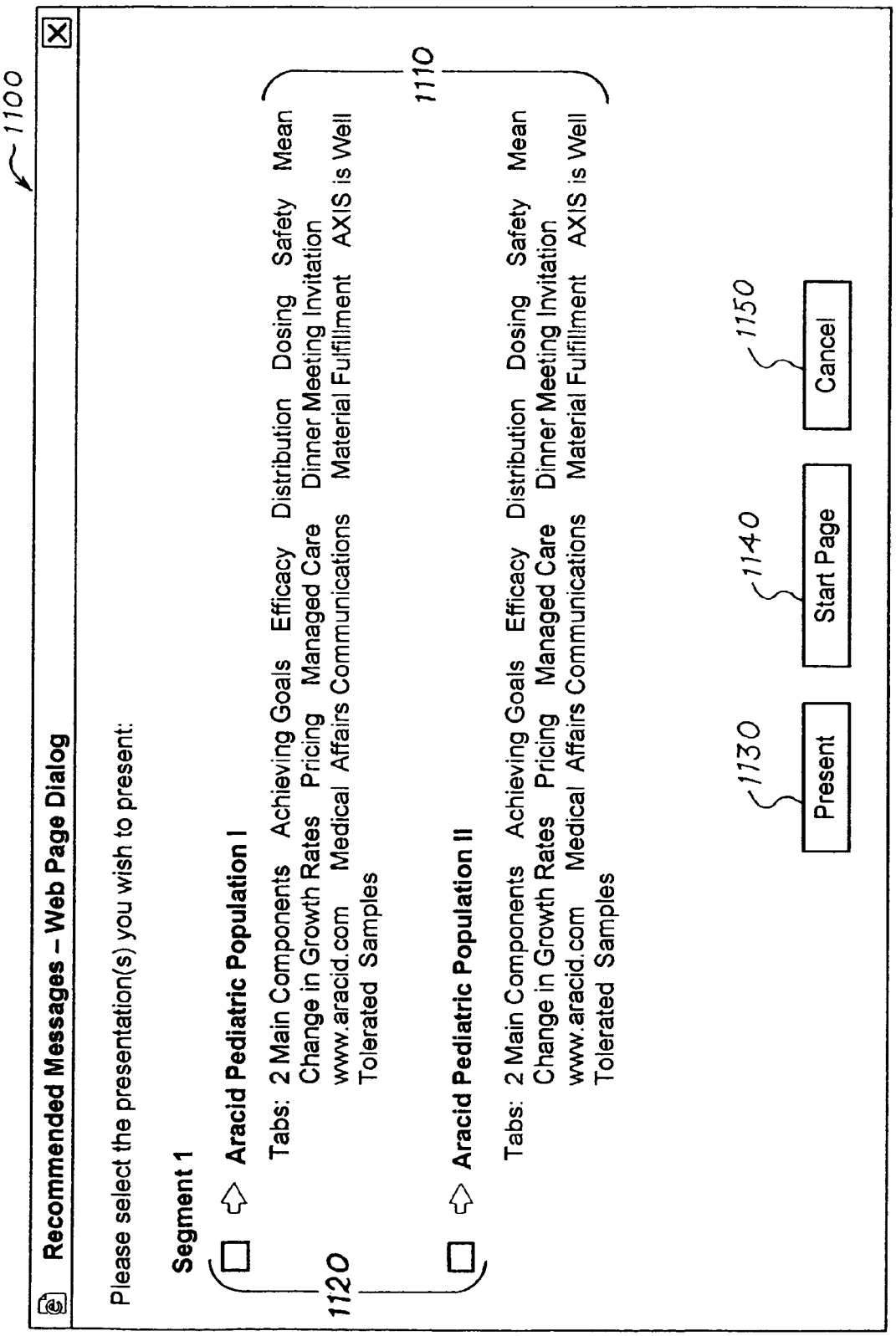
FIG. 11 illustrates a recommended messages screen through which a sales representative may view and select presentations that the sales representatives desire to present.

FIG. 11 illustrates a recommended messages screen 1100. The screen 1100 allows the sales representative to view and select presentations that the sales representative desires to present. The list of available presentations is determined and generated by comparing the segment information that is associated to each customer 120 and to the segment information assigned to each presentation. Presentations with segment data matching the segment data of the customer 120 are included on the list. Customers 120 and presentations can each belong to one or more segments. The recommended messages screen 1100 provides a list of presentations 1110 and check boxes 1120 for the sales representative to select one or more presentations 1110. The presentations can be listed by segment. In the pharmaceutical industry, the segments can include physicians that prescribe a high amount of medication, physicians that prescribe a low amount of medications, physicians that split prescription between multiple drugs and loyalists that are loyal to a particular manufacturer's product. The sales representative 130 can activate a present button 1130 to show the selected presentation or presentations, activate a start page button 1140 to launch the home page 410 without showing a presentation and activate a cancel button 1150 to abort the detailing software program without showing a presentation.

Referring to FIG. 4, during and/or after the presentation, the sales representative can switch the association of a presentation to a different customer by returning to the contact search screen 420. The sales representative can also close the presentation, such as when it ends, to open a call notes entry screen 460.

FIG. 12 is an exemplary call notes entry screen 460. The call notes entry screen 460 can include a field 1200, or multiple fields, for the sales representative to enter notes, such as noting events that occurred during the sales call. The call notes entry screen 460 can incorporate different types of controls such as textboxes, check boxes, list boxes, and radio buttons, to collect information about the sales call, such as information from the sales representative 130. A call note may take other forms such as a voice recording, video recording, or a mix of voice, video and/or text. The call notes entry screen 460 can be tailored to a particular customer, such as by including customer information 1210 about the customer 120. The call notes entry screen 460 can also display other information such as presentation information 1220 which can include information about the presentation such as a name and date of the presentation. The call notes entry screen 460 can also include a user activated save button 1230 such that the sales representative can save the entered call notes, and a cancel button 1240 such that the sales representative can cancel the call notes screen without saving.

Figure 13:
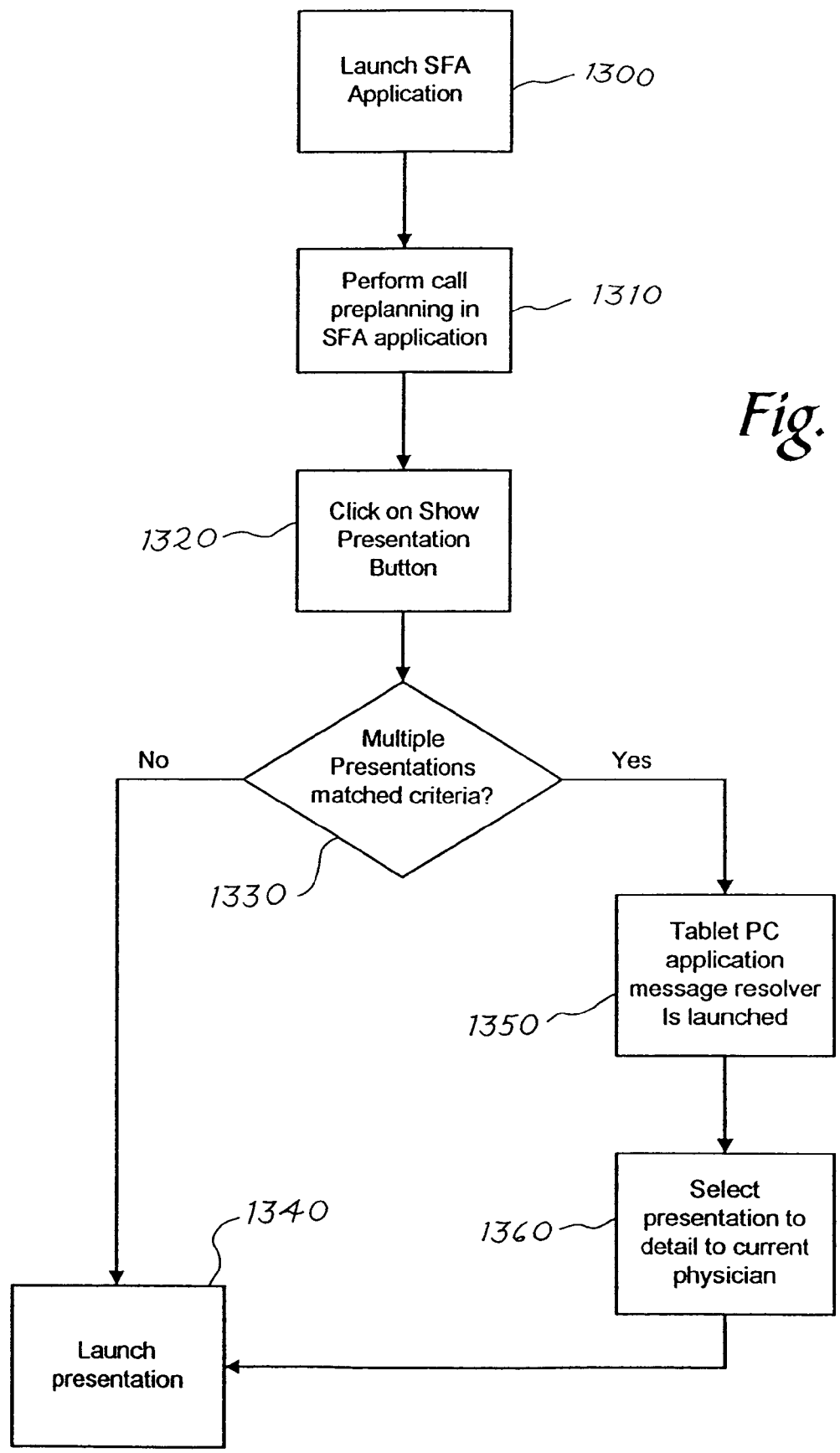
FIG. 13 is a flow chart illustrating an exemplary methodology for a sales representative to present to the customer.

FIG. 13 is a flow chart illustrating an exemplary methodology for a sales representative 130 to present to the customer 120. At block 1300, the sales representative 130 can launch a sales force automation tool of the business tool 140, such as one manufactured by SIEBEL. The sales force automation tool can be launched before the sales representative visits the customer 120, such as in preparation for the meeting, or on site, during the meeting. At block 1310, the sales representative 130 can perform call preplanning with the sales force automation tool. Using the tool, the sales representative can view the pre-call information screen 440 to review past call activities with the listed customers and review information of the customer being visited.

At block 1320, the sales representative 130 can activate the launch presentation button 824 to review the presentation to be launched. Activating the launch presentation button 824 may start the application to call a Uniform Resource Locator (URL) to pass the information about the customer from the sales force information tool to the detailing software. The information can be sent via a network, such as the Internet, in XML format.

Figure 14:
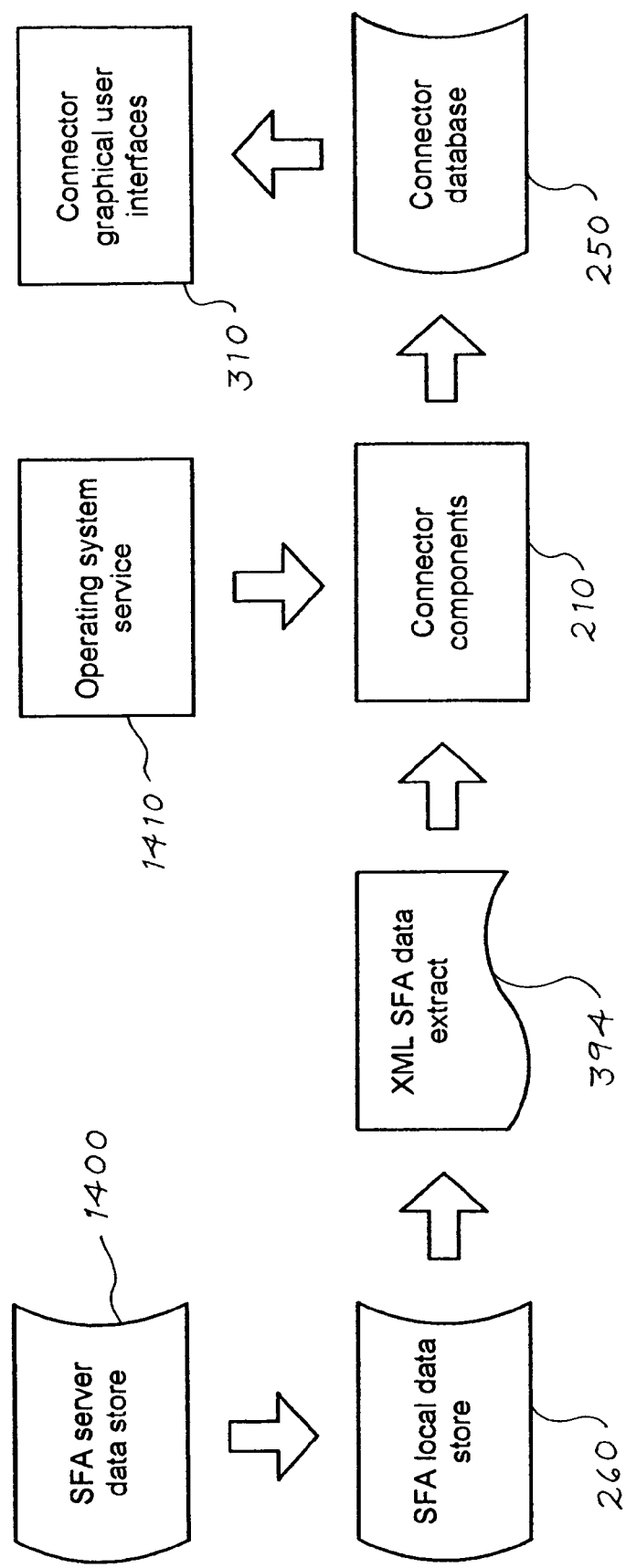
FIG. 14 is a block diagram of an exemplary data flow from the sales force automation tool to the detailing software.

FIG. 14 is a block diagram of an exemplary data flow from the sales force automation tool to the detailing software. Data from the sales force automation server data store 1400 can be transferred to the sales force automation tool local data store 260 to synchronize the local data store 260 with the server data store 1300. Upon synchronization, data can be extracted 394 from the local store 260 and converted, such as to an XML file, to be transported to the connector components 210. An operating system service 1410, such as WINDOWS, can be used to parse the XML file and load the information from the connector components 210 into the connector database 250, such as an ACCESS or other database 360. An interface 310 of the connector can be used to display the information stored at the connector database 250.

At block 1330 (FIG. 13), after the detailing software receives the downloaded information, the detailing software can determine if information for more than one presentation was received. At block 1340, if information for only one presentation was received, the presentation can be automatically launched. At block 1350, if more that one presentation was received, the detailing software can launch a message resolver application, for example, on the tablet PC. At block 1360, the message resolver application allows the sales representative 130, or other user, to select presentations to present to the customer 120. At block 1340, after the presentation is selected, the presentation can be launched.

Figure 15:
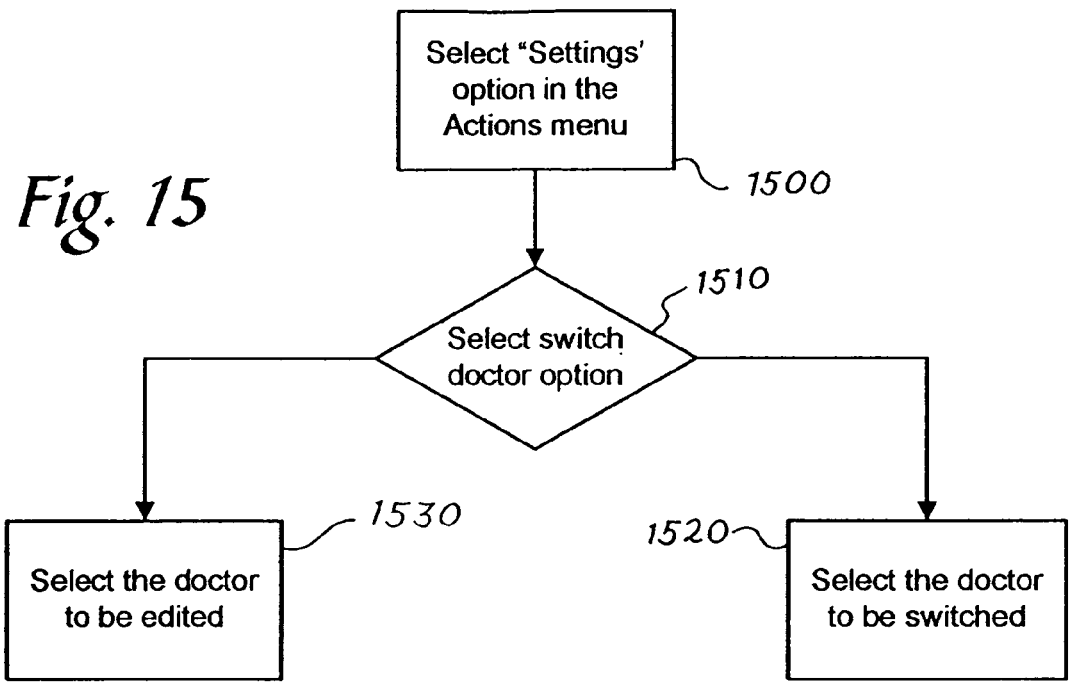
FIG. 15 is a flow chart illustrating a methodology for on-site switching presentations.

FIG. 15 is a flow chart illustrating a methodology for on-site switching of the presentation association from one customer to another customer. The detailing software can be set up to allow the sales representative to switch between different customers 120 that may receive presentations such as if the sales representative had planned to visit one customer 120 but ended up visiting another customer 120. If the sales representative desires to switch from one customer 120 to another, such as before or during an interactive presentation 450 (FIG. 4) at block 1500, the sales representative 130 can select a switch physicain option from the detailing software, such as from an action menu or by pressing a button of the detailing software. At block 1510, within the action menu the sales representative selects the switch physician option. Selecting the option can provide the sales representative with a list of customers 120 available for switching, such as on search result screen 430 (FIG. 4). The list of customers 120 can be assembled from a local data store of the connector, such as connector database 250. At block 1520, the sales representative 130 can select the customer 120 to which the sales representative desires to present. Thereafter, the sales representative can show a presentation specifically tailored to the changed customer 120. Additionally, at block 1530, the sales representative can select a customer 120 to edit information about the customer 120, such as by updating an address or phone number of the customer 120. Data from the sales call can be tracked to the last selected customer 120.

Figure 16:
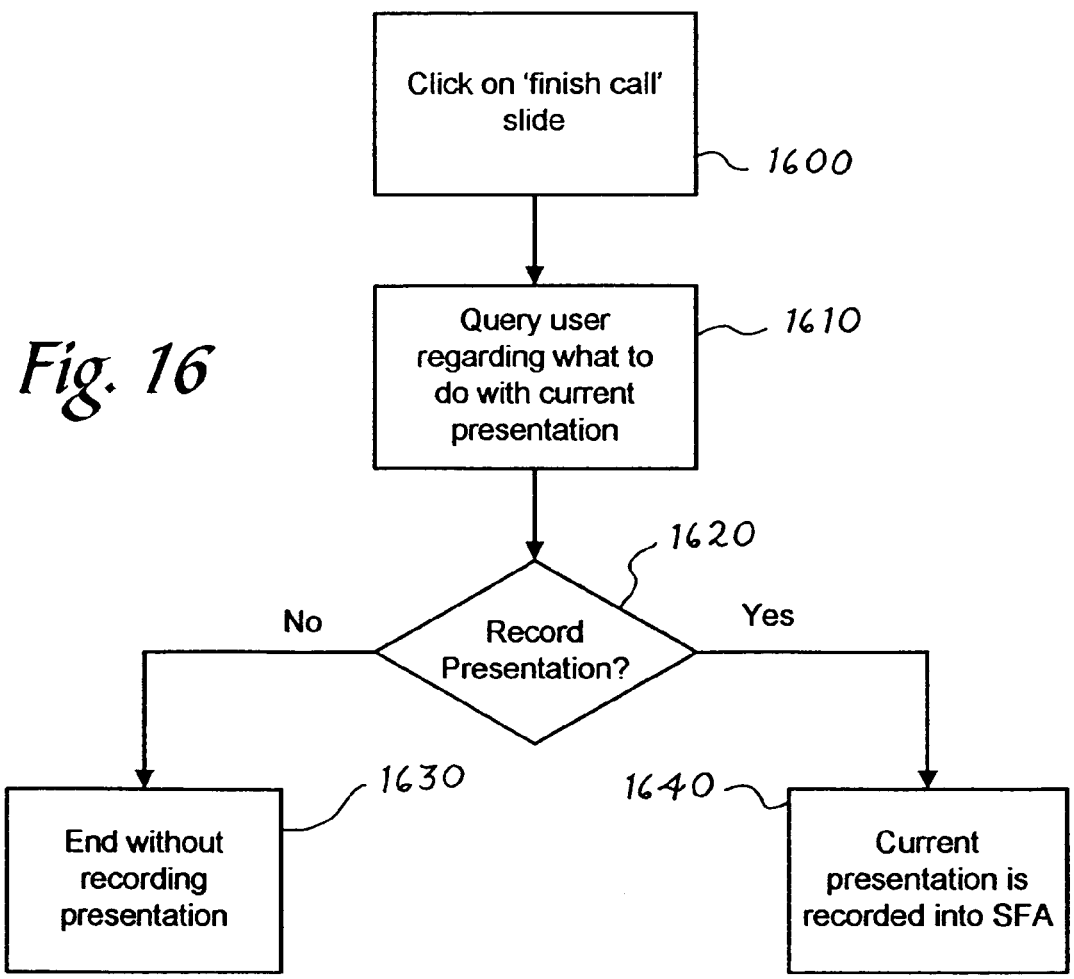
FIG. 16 is a flow chart illustrating a methodology for the sales representative to track data from the sales call.

FIG. 16 is a flow chart illustrating a methodology implemented by the detailing software for the sales representative to track data from the sales call. At block 1600, the sales representative 130 can click on a finish call slide, such as when the presentation is completed. The detailing software stores and closes the current presentation. The connector component 210 determines that the finish call slide was clicked, for example, by checking a last screen node in the PlayReport of the detailing software. At block 1610, a query can be presented to the sales representative 130 regarding what to do with the current presentation. At block 1620, the user interface 310 can display options to the sales representative, such as to record or discard the presentation. At block 1630, if the sales representative 130 chooses to end the presentation without recording, the presentation ends without recording events during the presentation. At block 1640, if the sales representative chooses to record, events that occurred during the presentation are recorded when the presentation ends. The recording events can be sent to the sales force automation tool for further analysis. In accordance with the results, future presentation can be modified.

Figure 17:
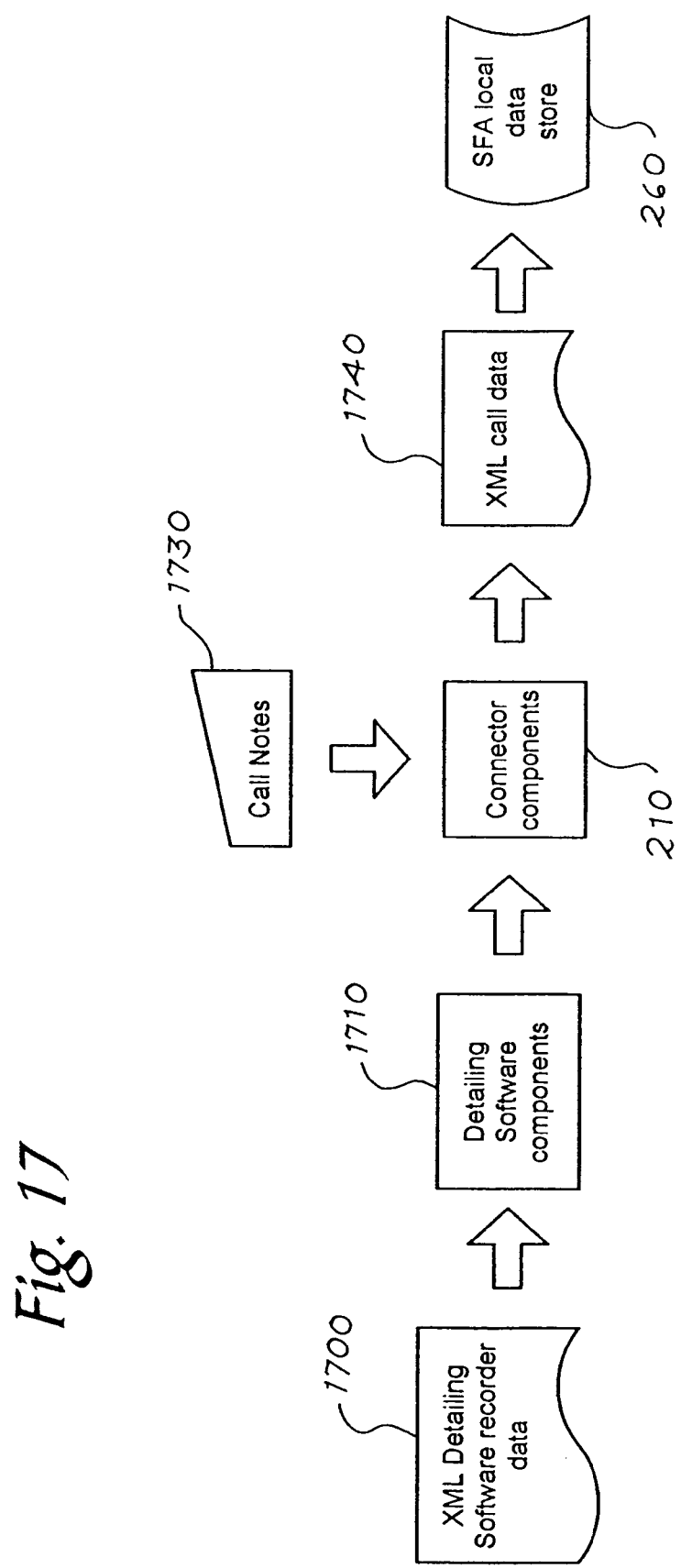
FIG. 17 is a block diagram illustrating an exemplary flow of data from the detailing software to the sales force automation tool.

FIG. 17 is a block diagram illustrating an exemplary flow of data from the detailing software to the sales force automation tool which may occur when the presentation ends or at other times. The presentation can be associated to a single entity such as a physician and/or associated to multiple physicians by associating the presentation to an account and listing all the attendees under the account. The associations can be accomplished with the sales force automation tool. The presentation can also be associated to an account in the detailing software. At block 1700, the detailing software records data which can be sent via the detailing software components 1710 to the connector component 210. The call notes data 1730, such as data entered onto the call notes entry screen 460 (FIG. 4), can also be inputted to the connector components 210. The connector components 210 can process the call notes data 1730 and the recorder data 1700 to convert the data to XML call data 1740. The XML call data 1740 can be transferred to the sales force automation local data store 260 of the sales force automation tool. The trigger event for transferring the data can be based on the sales force automation tool and/or the connector components 210. Examples of trigger events include data synchronization of the SFA local data store 260 with the connector database 250, such as access database 360, and/or the insertion of the XML call data as a file into a specific directory on the tablet PC.

Figure 18:
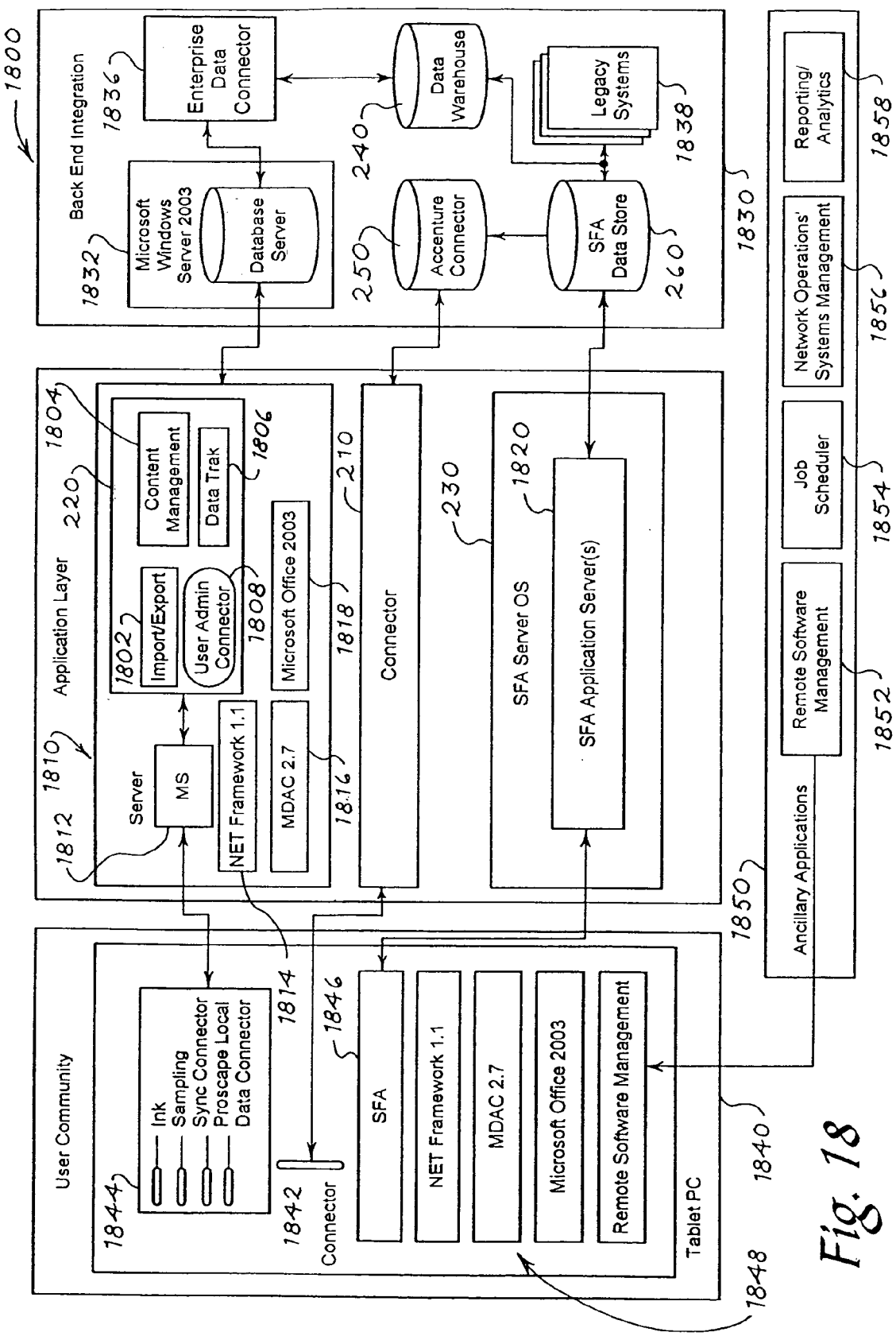
FIG. 18 is a block diagram of an exemplary architecture of a connector component, detailing component and a manage component.

FIG. 18 is a block diagram of an exemplary architecture 1800 of the connector component 210, detailing component 220 and manage component 230. A three-tiered architecture 1800 is shown, but other architectures can be used. The architecture may integrate legacy systems into the data management operations. The detailing component 220 can operate in both a connected and a disconnected environment. When connected, users such as sales representatives 130 can deliver presentations directly from the detailing component 220, or a user, such as a physician, can be directed to a guest account for access to the presentation.

The detailing component 220 can provide for the import/export 1802 of data, content management 1804, DataTrak 1806, or other logic to track the data between applications, and a user administration connector 1808. The detailing component 220 can execute in an environment 1810 that includes a server 1812 such as MICROSOFT WINDOWS SERVER 2003, .NET Framework 1814 version 1.1, MDAC 1816 version 2.7, and MICROSOFT OFFICE 1818 version 2003. The sales force automation tool 230 includes server 1820.

A backend 1830 of the system 1800 includes a detailing component server 240, such as a PROSCAPE DATABASE SERVER 7.0/2000 executed on MICROSOFT WINDOWS SERVER 2003. The detailing component server 240 can run in a stand-alone, clustered, or load-balanced environment. As new users are added to the system or data traffic increases, scalable processor based servers, such as those manufactured by INTEL, can be added to accommodate the additional workloads. Processor intensive tasks, such as the importing and exporting of content, can be queued and sent to a low-end server for batch processing, a technique that can improve overall performance.

The detailing component server 1832 connects to a data warehouse 1834 via a data connector 1836 such as PROSCAPE ENTERPRISE DATA CONNECTOR. The data warehouse 1834 can connect to the sales force automation tool data store 260 and legacy system 1838 such as that provided by the SFA such as SIEBEL. The connector data store 250 can connect to the sales force automation tool data store 260. Information from the detailing component 220 can be synchronized periodically, such as every day, so that disconnected users can receive content updates and automatically transmit presentation data to the detailing component server 1832 for historical tracking and reporting. Companies 110 that integrate the detailing component 220 with an SFA managing component 230 can utilize the connector component 210 to facilitate communication directly between the detailing component 220 and the SFA managing component 230 to generate automate sales call reporting. Any data captured during a sales presentation can be sent to the SFA and recorded.

A presentation module 1840, such as a tablet personal computer, can be used to present data to customers 120 and capture data from customers. Connector component 210 provides a connection 1842 between a detailing component interface 1844 and an SFA interface component 1846. Presentations are constructed using various information including JPG images, Multipurpose Internet Mail Extension (MIME) files and other rich media content. The architecture 1800 can manage content at the individual file level, supporting optimization through content reuse. For example, a document such as a product specification may exist in each of ten presentations available to the sales representative 130. Synchronization with the detailing component 220 can ensures that only one instance of the product specification is downloaded to the client machine. For additional efficiency, the file can be updated in all presentations from a single location. To aid the sales representative 130, the presentation module 1840 can also include other applications 1848 including ancillary applications 1850. Ancillary applications 1850 include remote software management 1852, a job scheduler 1854, network operations system management 1856 and reporting/analysis tools 1858.

Figure 19:
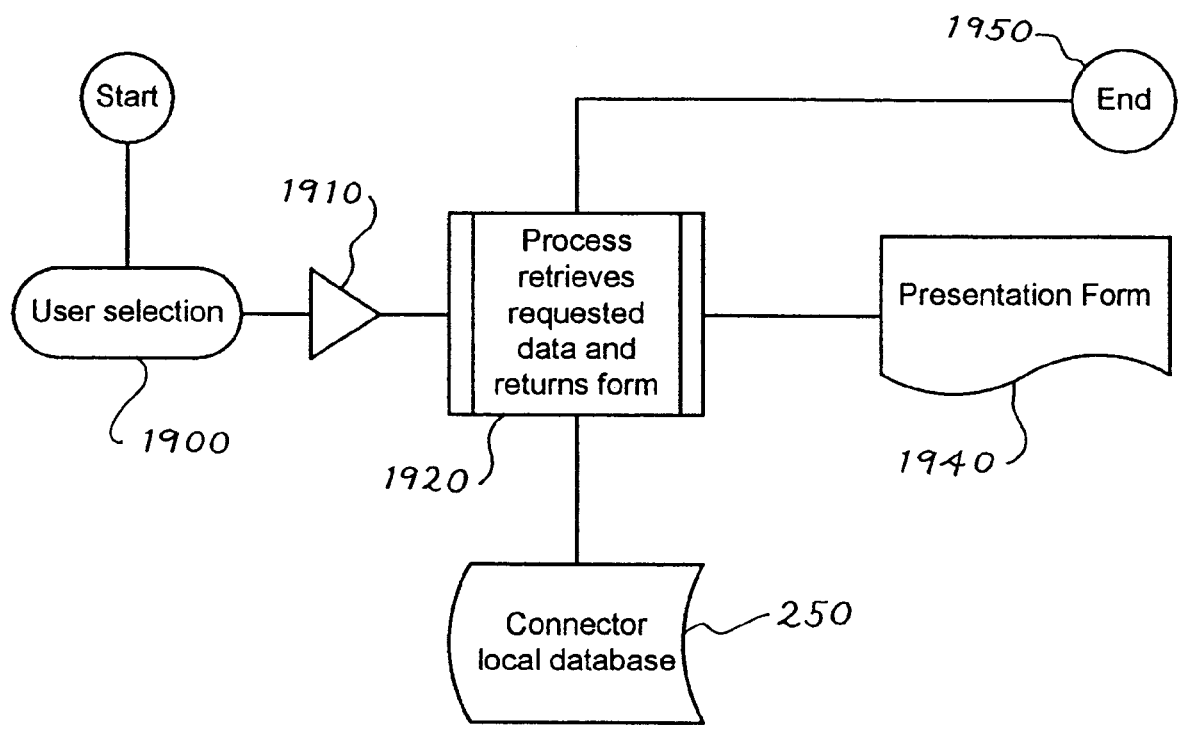
FIG. 19 is a block diagram of an exemplary process flow of data.

FIG. 19 is a block diagram of an exemplary process flow of data responsive to event triggers. At block 1900 the user, such as sales representative 130, will trigger an event, such as selecting a customer 120. At block 1910, control can transfer to a process 1920 to retrieve the requested data. The requested information is retrieved from a database, such as the connector data store 250. At block 1940, the data is returned and presented on a form, such as with the detailing component 220. At block 1950, the process completes.

Figure 20:
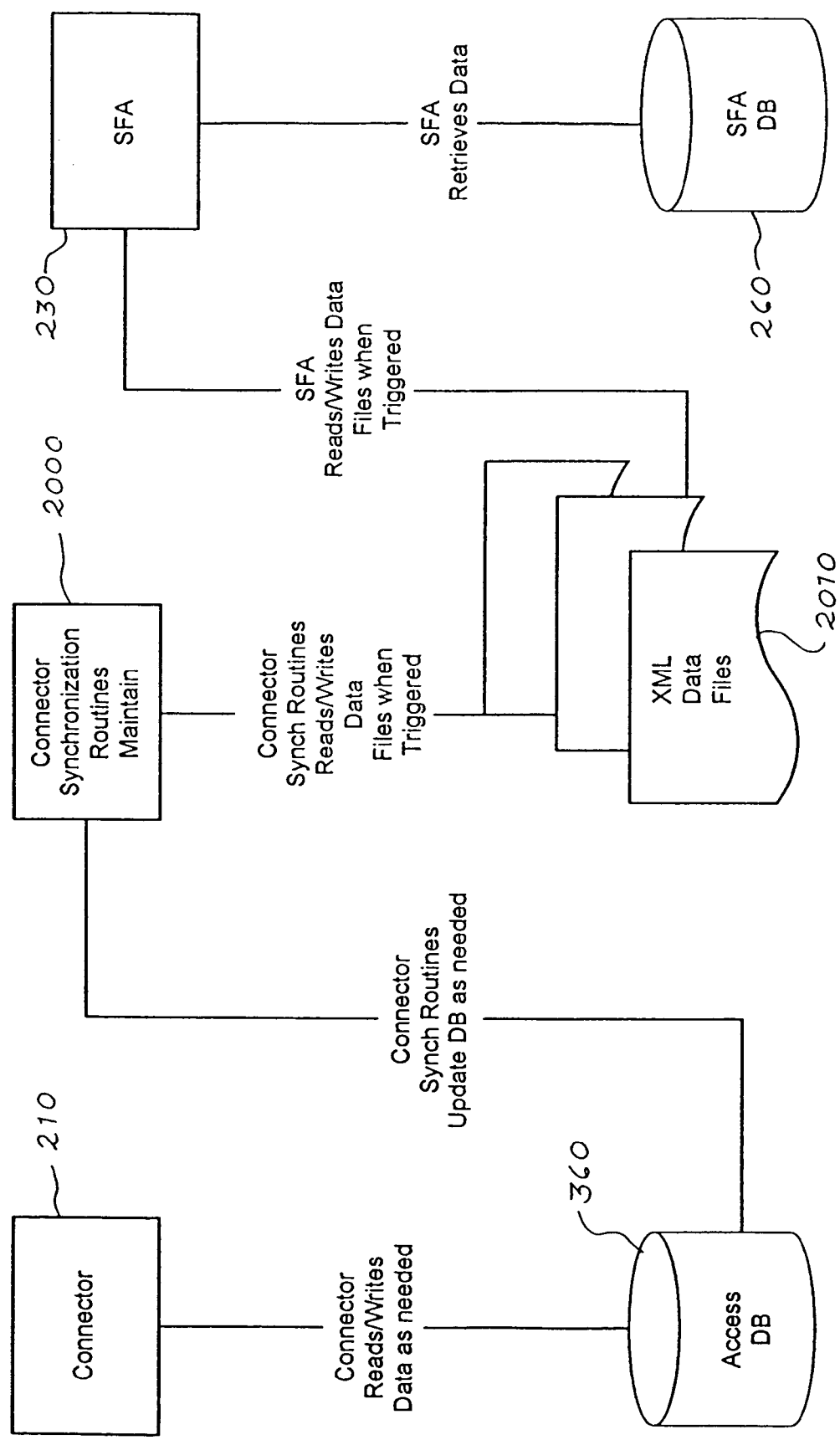
FIG. 20 is a block diagram of an exemplary process for the connector component to access the connector data store.

FIG. 20 is a block diagram of an exemplary process for the connector component 210 to access the connector data store 250. The connector component 210 utilizes the database 360 as a local data store. Information needed for the presentation layer is pulled from the database 360. At block 2000, synchronization routines may output and input files, such as XML files 2010, to maintain the data in the database 360 and also the SFA database 260. The XML files can be used as an intermediary to decouple the connector component 210 from the SFA manage component 230. The SFA manage component 230 can have direct integration that utilizes the XML file 2010 as input. The SFA database 260 can also produce XML files for the connector to use as input for the database 260.

Figure 21:
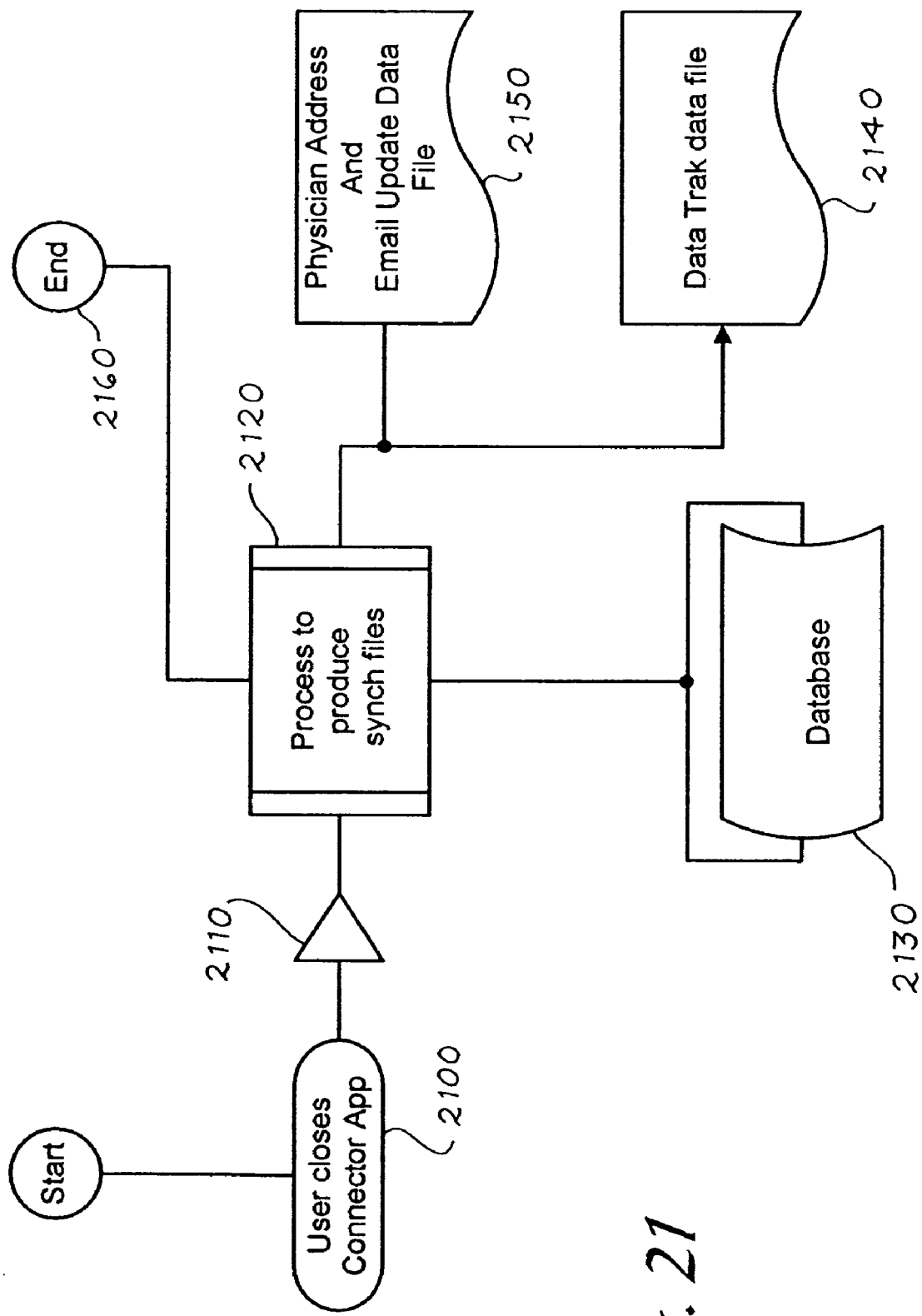
FIG. 21 is a block diagram of an exemplary process for synchronizing files.

FIG. 21 is a block diagram of an exemplary process for synchronizing files. At block 2100, the user such as a sales representative 130 closes, e.g., terminates, a connector application of the connector component 2100. At block 2110, control switches to the process within the connector application that produces synchronization file 2120 so that data between the different applications can be synchronized. At block 2130, the process will read information from the database or retrieve information from memory to produce two types of files. The first file can maintain DataTrak data, data stored in the databases and tracked via a DataTrak Id. The second file can include updated information about the customer 120, such as updated address and email information. At block 2140, appropriate data to create the DataTrak data file, the address/email update file, and/or both are retrieved. At block 2150, the updated file is produced. At block 2160, the process completes.

The SFA local data store 260 can save the DataTrak ID from the detailing component 220 for data synchronization and to improve the overall data integration between the detailing component 220 and the SFA manage component 230. Because the detailing component 220 generates one DataTrak ID for each presentation, even if the presentations are loaded into the same window, each presentation can be considered to be one call for the detailing component 220. Based on business needs, calls can be defined differently within the connector component or the SFA, such as all presentations detailed on the same day being regarded as a single call. The DataTrak data that will be captured in SFA manage component 230 include product detailed information, survey results information, and message detailed information. The types of survey data that can be captured include answers to True/False, Rank Order, and Multiple Choice questions.

Figure 22:
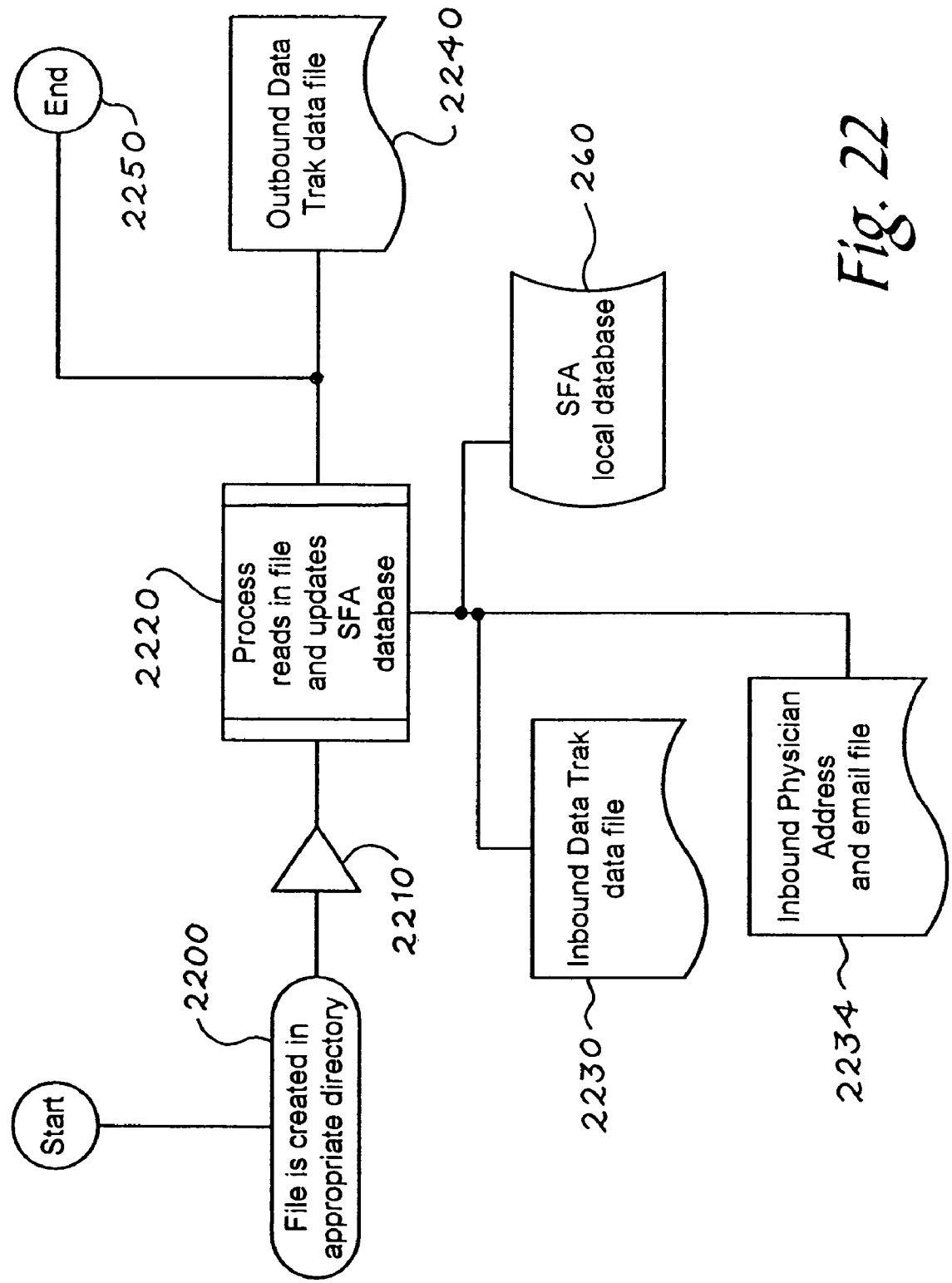
FIG. 22 is a block diagram of an exemplary process for updating service inbound synchronization files.

FIG. 22 is a block diagram of an exemplary process for updating service inbound synchronization files. The files contain data from the detailing component 220 to be loaded to the SFA data store 260, for example, as described in FIG. 17. At block 2200, a synchronization file is created in an appropriate directory. At block 2210, a service process polls the directory and activates upon finding a synchronization file. At block 2220, the service can retrieve and read any synchronization file such as an inbound DataTrak data file 2230 and inbound customer information 2234 found in the directory, and update the SFA data store 260. The service can update the SFA data store 260 directly or perform the updates through a direct integration with an exposed API. If there is no exposed API then XML file integration occurs via third party integration. At block 2240, for DataTrak data the process will produce a synchronization file for each DataTrak file received. The synchronization updates the connector local data store 250 to remove entries from the DataTrak history as each entry is updated in the SFA data store 260. At block 2250, the service process completes.

Figure 23:
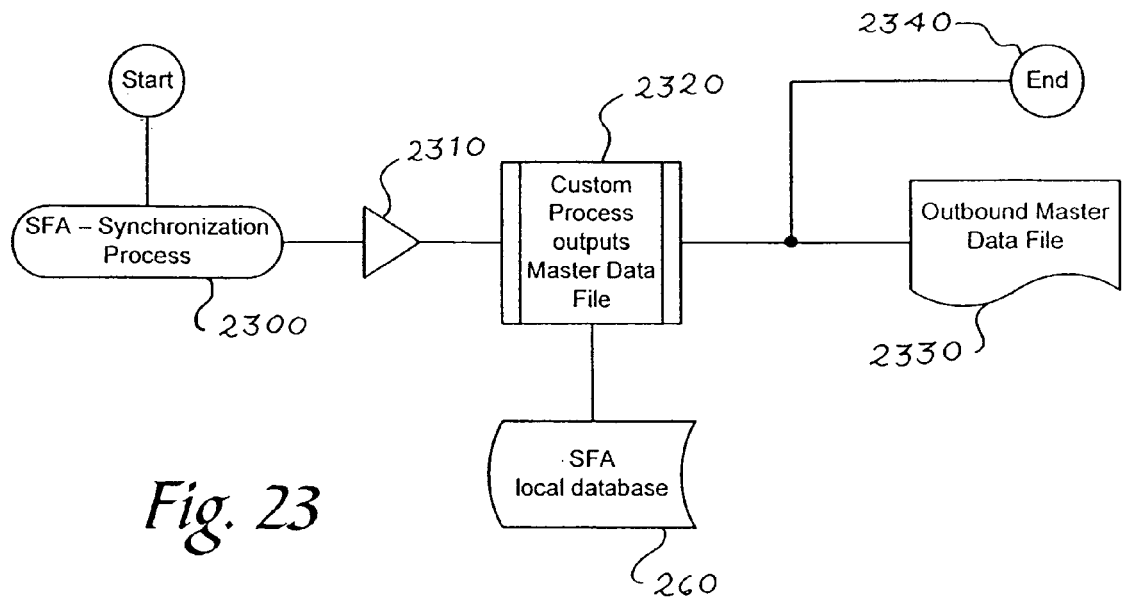
FIG. 23 is a block diagram of an exemplary process for synchronizing the service outbound master synchronization files.

FIG. 23 is a block diagram of an exemplary process for synchronizing the service outbound master synchronization files. The outbound synchronization files contain the data extract from the SFA to be loaded to the connector data store 250, for example, as described in FIG. 14. At block 2300, during the SFA synchronization process the process can produce the appropriate outputs to refresh the connector local data store 250. At block 2310, the synchronization process can transfer control to a custom process 2320 to retrieve the data, for example, by outputting a master data file. The custom process can retrieve the necessary data from the SFA local database 260. At block 1330, the custom process can output the necessary data in the appropriate format, such as XML. At block 2340, the process ends.

Figure 24:
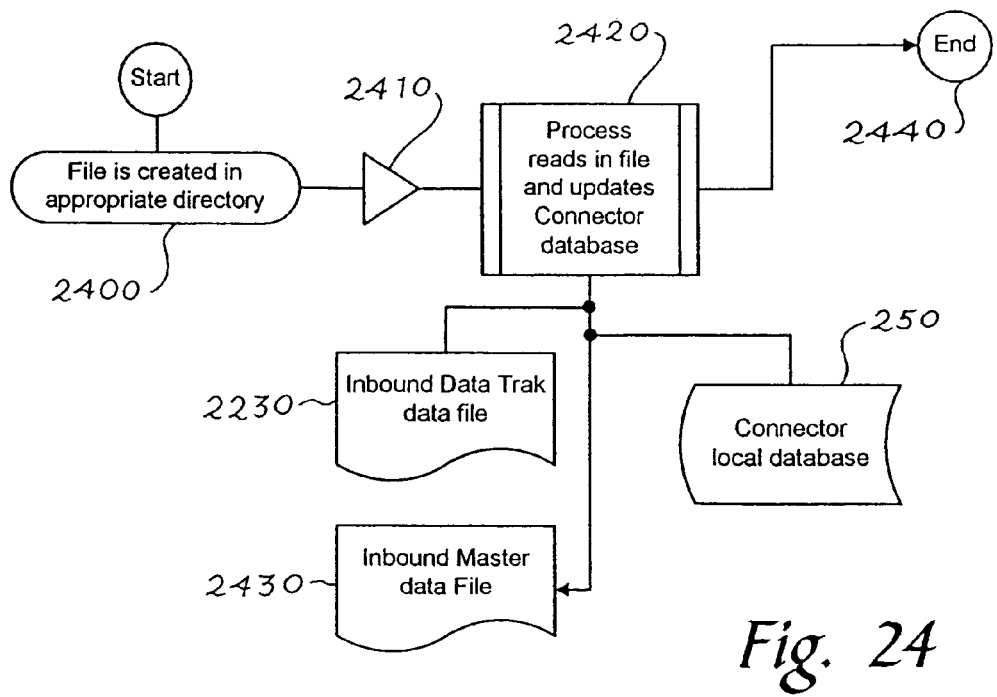
FIG. 24 is a block diagram of an exemplary process for servicing inbound synchronization files.

FIG. 24 is a block diagram of an exemplary process for servicing inbound synchronization files. A synchronization file is created in the appropriate directory. At block 2400, a service process polls the directory and activate upon finding a synchronization file. At block 2410, the service can retrieve and read any synchronization file found in the directory. At block 2420, the service can update the connector data store 250 directly. The service can include two tracks. The first track remove entries from the DataTrak tables when corresponding entries are found to have been successfully entered by the SFA synch routines. The second track truncates all data tables except the DataTrak related tables and populate the database with the new information, such as the inbound DataTrak data file 2230 and the inbound master data file 2430. At block 2440, the service process completes.

Figure 25:
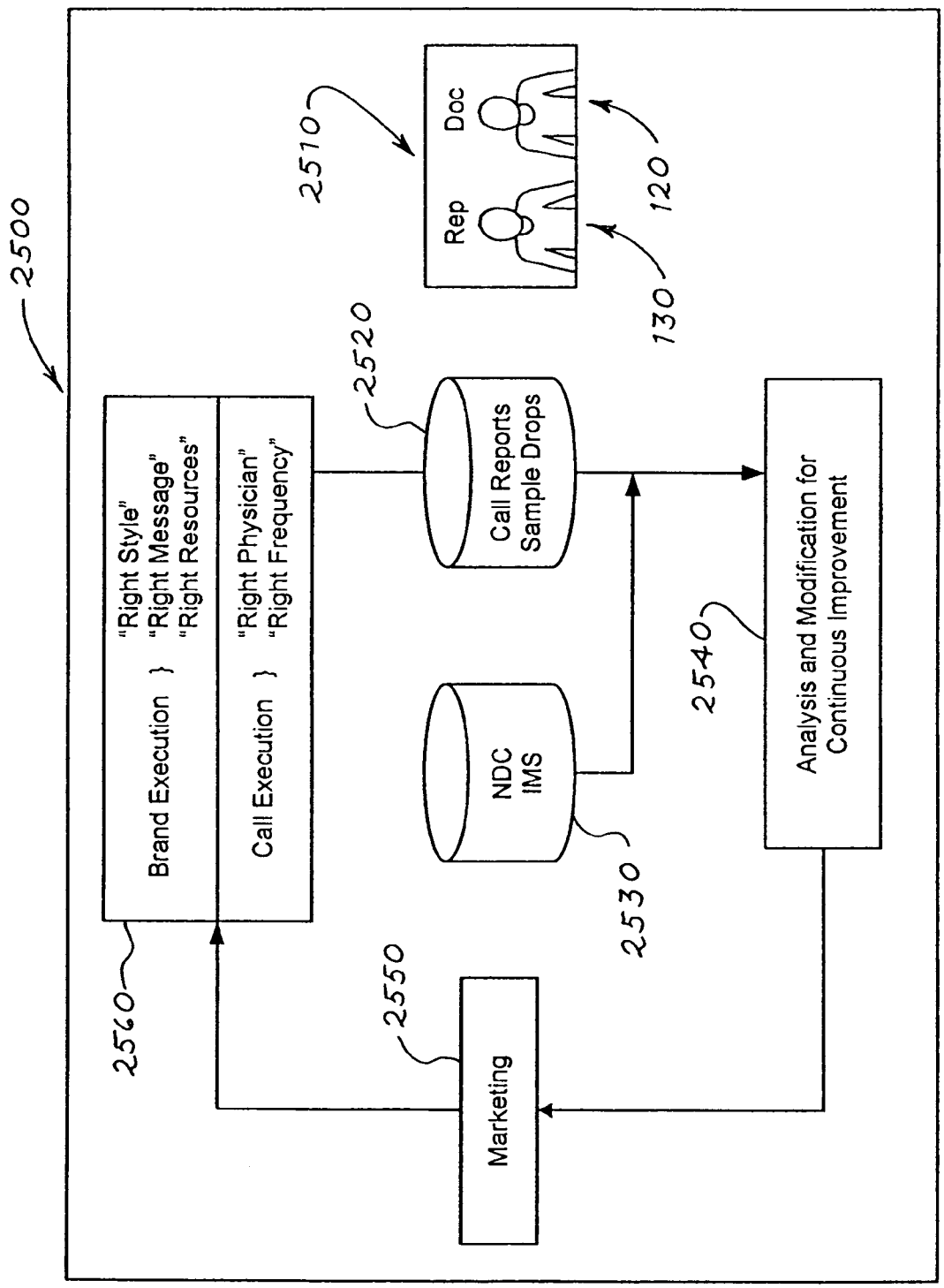
FIG. 25 is a block diagram illustrating the use of analytical tools in an exemplary marketing system to provide customized sales presentations to customers.

FIG. 25 is a block diagram illustrating the use of analytical tools in an exemplary marketing system 2500 to provide customized sales presentations to customers 110. The information flow can provide a continuous feedback loop that helps shape the messages to customers 110, such as physicians, in response to results in particular market segments and previous campaign results. A customized message is planned for the customer 120 and then delivered to the customer 120. During and/or after a presentation 2510 the sales representative 130 can capture interaction data, such as by using the detailing application 132, including call report information 2520 and other information about the sales call such as samples provided to the customer 120 and feedback received from the customer 120. The call report information 2520 can be combined with other information such as sales force tool information 2530. The sales force tool information 2530 can include data from NDC and IMS or other vendors that collect prescription sales data from pharmacies and other resources, and provide the data to the pharmaceutical companies. The results of the sales call, such as the call report information 2520 and sales force tool information 2530 can be returned to the company 110 through a wireless or landline connection to be used to support and/or modify sales analytic modules 2540. The results of the analytic models 2540 can be fed to marketing 2550 who can decide to refine the sales message. The refined sales message can affect brand execution and call execution 2560. Brand execution can include determining a style and message of the presentation, and resources to deliver the presentation. Call execution can include determining the particular customers, such as physicians, to visit and the frequency of the visit. The refined message can then be delivered to the customers 130, and the whole process can be repeated.

Using the approach, the sales representatives 130 have tools and data at hand to engage customers 120 in discussions about precise areas of interest. By sharpening and focusing messages in this manner, the sales force and marketing team gain the benefit of real-time insights into the effectiveness of the marketing messages and they can direct their campaigns accordingly. The system can improve the sales force's ability to deliver specialized messages and enable marketing to evaluate the effectiveness of their promotions. Brand managers and brand teams can benefit from the ability to rapidly deliver specialized messages and promotional aids to a targeted, segmented audience. Additionally, market research can be quickly gathered and synthesized to analyze the impact of messages. The brand managers and brand teams can gain a deeper insight into the customer, which can ultimately drive a more effective sales interaction.

Sales leadership can benefit from the representative's ability to generate dynamic visual aids and engage the physicians with on demand integrated marketing and clinical content. Other benefits can include the reduction in the administrative burden of recording call details and the ability to easily provide near real-time feedback to the brand team and sales leadership on all calls.

Customers can benefit from the targeted messages that are more balanced and contain useful information and industry news. The system can enable companies to conduct rapid market research with customers by having the sales representatives gather information from the customers by asking questions. The answers to the questions can allow for better benchmarking data and more meaningful data, which are typically well received by the customer. The system can provide the pharmaceutical company with an improved ability to effectively and rapidly deliver educational and clinical content that is more up-to-date, objective, current and relevant.

Sales representative can receive updated information and materials from the brand teams as soon as they are available. One location can be used to easily access updated brand and clinical information along with updated program information. The sales representatives can be able to converse with the customer 120 by utilizing interactive, engaging multimedia aids that can assist in the educational aspect and details of the product. Post-call administrative activities can be reduced, as can the hassle of ordering and carrying paper materials. The sales representative can be more productive during in-territory downtime.

The company can leverage their marketing and sales teams, along with the newest technologies to create a competitive advantage by providing customers with timely, tailored messages that ultimately assists the customer, such as assisting a physician to provide optimal medication and information about the medication to their patients.

Although particular embodiments have been disclosed herein in detail, this has been done for purposes of illustration only and is not intended to be limiting with respect to the scope of the appended claims that follow. In particular, it is contemplated by the inventors that various substitutions, alterations, and modifications may be made to the invention without departing from the spirit and scope of the invention as defined by the claims. Other aspects, advantages, and modifications are considered to be within the scope of the following claims.

We claim:

1. A method for supporting interactive presentations to a customer, the method comprising:

receiving a customer characteristic from a sales representative presentation device, the customer characteristic being received via a connector component connected with the sales representative presentation device;

extracting a plurality of interactive presentations from a sales force automation tool, the plurality of interactive presentations being extracted via the connector component, the connector component being connected with the sales force automation tool, wherein the plurality of interactive presentations are tailored to the customer based on the customer characteristic, the plurality of interactive presentations including content that is common between the plurality of interactive presentations; and transmitting the plurality of interactive presentations to the sales representative presentation device, wherein the plurality of interactive presentations is transmitted via the connector component, wherein the connector component transmits the plurality of interactive presentations and transmits one instance of the content that is common between the plurality of interactive presentations when multiple content exists.

2. The method of claim 1 wherein the customer characteristic comprises the name of a customer.

3. The method of claim 1 wherein the customer characteristic comprises the name of a physician.

4. The method of claim 1 wherein the customer characteristic comprises an identification number of the customer.

5. The method of claim 1 wherein the plurality of interactive presentations comprise information about a prescription.

6. The method of claim 1 wherein the plurality of interactive presentations are stored in a data store located remotely from the sales force automation tool.

7. A method for supporting interactive presentations to a customer, the method comprising:
- transmitting a customer characteristic from a sales representative presentation device to a sales force automation tool, the customer characteristic being transmitted via a connector component connected with the sales representative presentation device and the sales force automation tool;
- receiving a plurality of interactive presentations from the sales force automation tool via the connector component, the plurality of interactive presentations being based on the customer characteristic, the plurality of interactive presentations including content that is common between the plurality of interactive presentations; and
- displaying the plurality of interactive presentations to the sales representative presentation device via the connector component, wherein the connector component transmits the plurality of interactive presentations to the sales representative presentation device and transmits one instance of the content that is common between the plurality of interactive presentations when multiple content exists.

8. The method of claim 7 further comprising collecting interaction data.

9. The method of claim 8 further comprising transmitting the interaction data to the sales force automation tool.

10. The method of claim 8 wherein the interaction data comprises call notes.

11. The method of claim 8 wherein the interaction data comprises answers to questions about the interactive presentations.

12. The method of claim 7 wherein the customer characteristic comprises the name of a customer.

13. The method of claim 7 wherein the customer characteristic comprises the name of a physician.

14. The method of claim 7 wherein the customer characteristic comprises an identification number of the customer.

15. The method of claim 7 wherein the plurality of interactive presentations comprise information about a prescription.

16. The method of claim 7 wherein the plurality of interactive presentations comprise an interactive presentation tailored to the customer.

17. A method for supporting interactive presentations to a customer, the method comprising:
- receiving a customer characteristic from a sales representative presentation device, the customer characteristic being received via a connector component connected with the sales representative presentation device;
- determining an interactive presentation based on the customer characteristic, the interactive presentation being determined from a plurality of interactive presentations, the plurality of interactive presentations including content that is common between the plurality of interactive presentations, the interactive presentation being determined with a sales force automation tool, the connector component being connected with the sales force automation tool; and
- transmitting the interactive presentation to the sales representative presentation device, wherein the presentation data is transmitted via the connector component, wherein the connector component transmits the interactive presentation and transmits one instance of the content that is common between the plurality of interactive presentations when multiple content exists.

18. The method of claim 17 wherein the interactive presentation is transmitted through the connector component to the sales representative presentation device.

19. The method of claim 17 wherein the customer characteristic comprises the name of a customer.

20. The method of claim 17 wherein the customer characteristic comprises the name of a physician.

21. The method of claim 17 wherein the customer characteristic comprises an identification number of the customer.

22. The method of claim 17 wherein the presentation data comprises information about a prescription.

23. The method of claim 17 wherein the presentation data comprises an interactive presentation tailored to the customer.

24. A system for supporting interactive presentations to a potential customer, comprising:
- a data interface operable to receive a customer characteristic from a sales representative presentation device;
- a connector component operable to access an interactive presentation from a sales force automation tool based on the customer characteristic, the interactive presentation being accessed from a plurality of interactive presentations, the plurality of interactive presentations including content that is common between the plurality of interactive presentations, the connector component being connected with the sales representative presentation device and the sales force automation tool; where
- the connector component transmits the interactive presentation to the sales representative presentation device and transmits one instance of the content that is common between the plurality of interactive presentations when multiple content exists.

25. The system of claim 24 wherein the data interface is further operable to receive interaction data.

26. The system of claim 25 wherein the connector component is operable to transmit the interaction data to the sales force automation tool.

27. The system of claim 25 wherein the interaction data comprises call notes.

28. The system of claim 25 wherein the interaction data comprises answers to questions about the interactive presentations.

29. The system of claim 24 wherein the customer characteristic comprises the name of a customer.

30. The system of claim 24 wherein the customer characteristic comprises the name of a physician.

31. The system of claim 24 wherein the customer characteristic comprises an identification number of the customer.

32. The system of claim 24 wherein the presentation data comprises information about a prescription.

33. A system for supporting interactive presentations to a customer, comprising:
- a sales representative presentation device for inputting a customer characteristic;
- a connector component for sending the customer characteristic to a sales force automation tool, the connector component being connected with the sales representative presentation device and the sales force automation tool; where
- the sales force automation tool provides interactive presentation data via the connector component based on the customer characteristic, where the interactive presentation data is tailored to the customer, the interactive presentation data being used for a plurality of interactive presentations, the plurality of interactive presentations including content that is common between the plurality of interactive presentations, the connector component to transmit the plurality of interactive presentations to the sales representative presentation device and transmits one instance of the content that is common between the plurality of interactive presentations when multiple content exists.

34. The system of claim 33 wherein the sales representative presentation device is used to collect interaction data.

35. The system of claim 34 wherein the connector component transmits the interaction data to the sales force automation tool.

36. The system of claim 34 wherein the interaction data comprises call notes.

37. The system of claim 34 wherein the interaction data comprises answers to questions about the interactive presentations.

38. The system of claim 34 wherein the connector component sends the interaction data upon the occurrence of a triggering event.

39. The system of claim 38 wherein the triggering event comprises the end of a presentation.

40. The system of claim 33 wherein the customer characteristic comprises the name of a customer.

41. The system of claim 33 wherein the customer characteristic comprises the name of a physician.

42. The system of claim 33 wherein the customer characteristic comprises an identification number of the customer.

43. The system of claim 33 wherein the presentation data comprises information about a prescription.

44. The system of claim 33 where the sales representative presentation device comprises a tablet personal computer.

* * * * *

UNITED STATES PATENT AND TRADEMARK OFFICE
CERTIFICATE OF CORRECTION

PATENT NO. : 7,480,624 B2  Page 1 of 1
APPLICATION NO. : 10/951440
DATED : January 20, 2009
INVENTOR(S) : Shawn D. Roman et al.

It is certified that error appears in the above-identified patent and that said Letters Patent is hereby corrected as shown below:

In the Specification

In column 9, line 41, after "presentation dialog screen" delete "100" and substitute --1000-- in its place;

In column 9, line 61, after "dialog screen" delete "100" and substitute --1000-- in its place.

In column 15, line 11, after "presentations to customers" delete "110" and substitute --120-- in its place.

In column 15, line 13, after "messages to customers" delete "110" and substitute --120-- in its place.

In column 15, line 40, after "to the customers" delete "130" and substitute --120-- in its place.

Signed and Sealed this

Thirtieth Day of June, 2009

JOHN DOLL
*Acting Director of the United States Patent and Trademark Office*